(12) United States Patent
Choi et al.

(10) Patent No.: US 11,088,571 B2
(45) Date of Patent: Aug. 10, 2021

(54) ELECTRONIC APPARATUS AND DISPLAY APPARATUS, AND METHOD FOR OPERATING APPARATUSES

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Young-ho Choi, Suwon-si (KR); Chun-taek Rim, Gwangju (KR); Eun-soo Lee, Daejeon (KR); Young-chan Park, Hwaseong-si (KR); Kyu-sung Lee, Ansan-si (KR); Sang-min Lim, Yongin-si (KR); Byeong-guk Choi, Daejeon (KR); Jin-soo Choi, Daejeon (KR); Ho-jic Kim, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/318,492

(22) PCT Filed: Jun. 22, 2017

(86) PCT No.: PCT/KR2017/006593
§ 371 (c)(1),
(2) Date: Jan. 17, 2019

(87) PCT Pub. No.: WO2018/016751
PCT Pub. Date: Jan. 25, 2018

(65) Prior Publication Data
US 2019/0157910 A1    May 23, 2019

(30) Foreign Application Priority Data

Jul. 18, 2016    (KR) .................. 10-2016-0090742

(51) Int. Cl.
*H02M 7/00*    (2006.01)
*H02J 50/12*    (2016.01)
(Continued)

(52) U.S. Cl.
CPC ............ *H02J 50/12* (2016.02); *G09G 3/2096* (2013.01); *H02M 1/00* (2013.01); *H02M 1/08* (2013.01);
(Continued)

(58) Field of Classification Search
CPC .... H04B 5/00; H02H 3/38; H02H 5/04; H02J 7/025
See application file for complete search history.

(56) References Cited

U.S. PATENT DOCUMENTS 8,803,365 B2    8/2014    Lee et al.
9,287,039 B2    3/2016    Lee et al.
(Continued)

FOREIGN PATENT DOCUMENTS

CN    203744088 U    7/2014
EP    2 889 177    7/2015
(Continued)

OTHER PUBLICATIONS

International Search Report for PCT/KR2017/006593, dated Oct. 16, 2017 and English-language translation, 4 pages.
(Continued)

*Primary Examiner* — Michael A Faragalla
(74) *Attorney, Agent, or Firm* — Nixon & Vanderhye, P.C.

(57) ABSTRACT

The present invention relates to an electronic apparatus and display apparatus, and method for driving the apparatuses,
(Continued)

and the display apparatus according to an embodiment of the present invention may comprise: a resonance circuit unit for generating voltage by means of inductive electromotive force generated due to an external apparatus; a rectification unit for rectifying the output voltage of the resonance circuit unit; and a converter for outputting the rectified voltage of the rectification unit as the target voltage by varying duty on the basis of duty data and target voltage determined in accordance with the distance from the external apparatus.

14 Claims, 23 Drawing Sheets

(51) Int. Cl.
| | |
|---|---|
| H02M 7/5387 | (2007.01) |
| H02M 1/08 | (2006.01) |
| G09G 3/20 | (2006.01) |
| H02M 1/00 | (2006.01) |
| H02M 3/28 | (2006.01) |
| H02M 7/48 | (2007.01) |
| H02M 1/44 | (2007.01) |
| G09G 3/3233 | (2016.01) |
| G09G 3/3266 | (2016.01) |
| G09G 3/3275 | (2016.01) |
| H02M 1/42 | (2007.01) |

(52) U.S. Cl.
CPC .............. *H02M 1/083* (2013.01); *H02M 3/28* (2013.01); *H02M 7/48* (2013.01); *H02M 7/53871* (2013.01); *G09G 3/3233* (2013.01); *G09G 3/3266* (2013.01); *G09G 3/3275* (2013.01); *G09G 2310/08* (2013.01); *G09G 2330/028* (2013.01); *H02M 1/4208* (2013.01); *H02M 1/44* (2013.01)

(56) References Cited

U.S. PATENT DOCUMENTS

| | | | |
|---|---|---|---|
| 9,378,888 B2 | 6/2016 | Hosotani | |
| 9,472,974 B2 | 10/2016 | Shionoiri et al. | |
| 9,608,452 B2 | 3/2017 | Kim et al. | |
| 9,985,458 B2 | 5/2018 | Kim et al. | |
| 2011/0109263 A1 | 5/2011 | Sakoda et al. | |
| 2011/0254377 A1* | 10/2011 | Wildmer | B60L 53/12 307/104 |
| 2012/0025627 A1 | 2/2012 | Shionoiri et al. | |
| 2013/0033117 A1 | 2/2013 | Kim et al. | |
| 2013/0300210 A1* | 11/2013 | Hosotani | H02J 5/005 307/104 |
| 2014/0333147 A1 | 11/2014 | Lee et al. | |
| 2014/0368053 A1* | 12/2014 | Lee | H01F 38/14 307/104 |
| 2015/0077051 A1 | 3/2015 | Kim et al. | |
| 2015/0249484 A1* | 9/2015 | Mach | H04B 5/0037 307/104 |
| 2015/0372493 A1* | 12/2015 | Sankar | H02J 7/00308 307/104 |
| 2016/0079798 A1 | 3/2016 | Jeong et al. | |
| 2016/0172895 A1 | 6/2016 | Lee et al. | |

FOREIGN PATENT DOCUMENTS

| | | |
|---|---|---|
| JP | 5494838 | 5/2014 |
| KR | 10-2012-0005112 | 1/2012 |
| KR | 10-2012-0066281 | 6/2012 |
| KR | 10-2013-0015836 | 2/2013 |
| KR | 10-2013-0099015 | 9/2013 |
| KR | 10-2014-0007273 | 1/2014 |
| KR | 10-1390954 | 4/2014 |
| KR | 10-2014-0121200 | 10/2014 |
| KR | 10-2015-0031357 | 3/2015 |
| KR | 10-2015-0104228 | 9/2015 |
| WO | 2012/045050 | 4/2012 |
| WO | 2016-073867 | 5/2016 |

OTHER PUBLICATIONS

Written Opinion of the ISA for PCT/KR2017/006593, dated Oct. 16, 2017 and English-language translation, 12 pages.
Ryu et al., "Novel AC Equivalent Load Modeling for Resonant DC/DC Converter with Duty Adjusting Control Scheme", The Korean Institute of Power Electronics, Jul. 13-14, 2012, 4 pages—with English Abstract.
Extended European Search Report dated May 14, 2019 in counterpart European Patent Application No. 17831224.5.
Communication pursuant to Article 94(3) EPC dated May 14, 2020 in counterpart European Patent Application No. 17831224.5.

* cited by examiner (a)

(b)

(a)

(b)

(a)

(b)

(a)

(b)

(a)

(b)

(a)

(b)

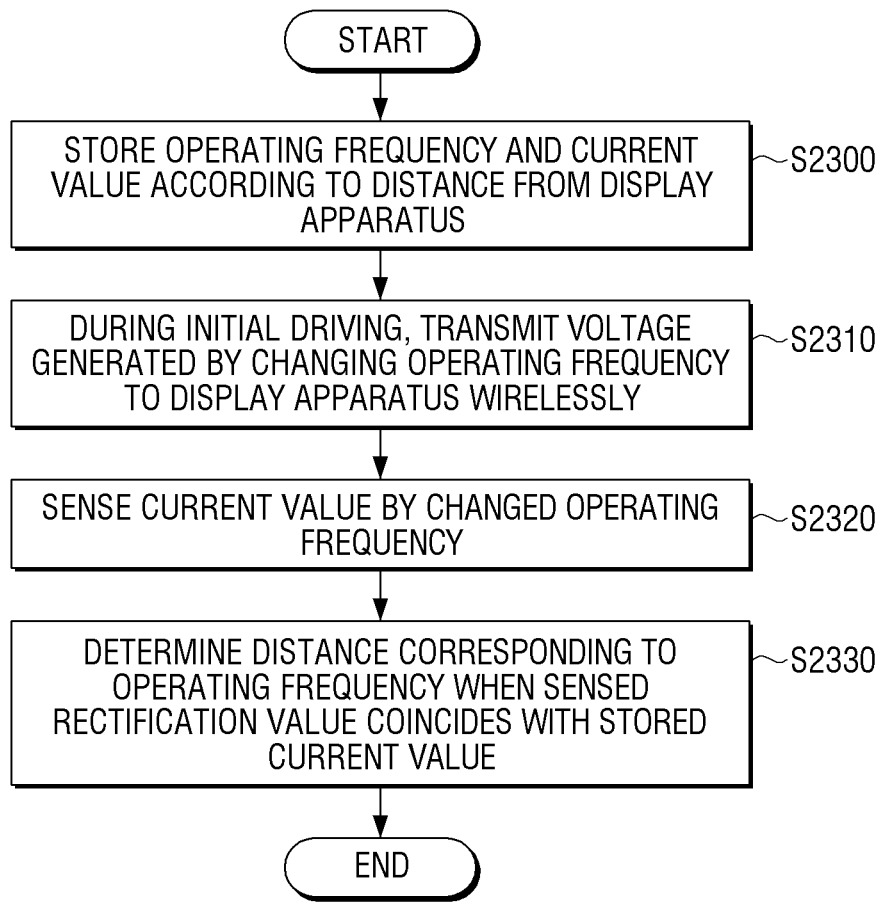

ELECTRONIC APPARATUS AND DISPLAY APPARATUS, AND METHOD FOR OPERATING APPARATUSES

This application is the U.S. national phase of International Application No. PCT/KR2017/006593 filed 22 Jun. 2017, which designated the U.S. and claims priority to KR Patent Application No. 10-2016-0090742 filed 18 Jul. 2016, the entire contents of each of which are hereby incorporated by reference.

TECHNICAL FIELD

Devices and methods consistent with what is disclosed herein relate to an electronic apparatus, a display apparatus, an operational method thereof, and more particularly, to a display apparatus such as a DTV for receiving power regardless of a distance from a peripheral apparatus and maintaining target power constantly, a display apparatus, an operational method thereof.

DESCRIPTION OF RELATED ART

Wireless power transfer is a technique for transmitting power wirelessly. The wireless power transfer is referred to as Wi-power similarly to a Wi-Fi technique which enables free Internet access only with a wireless adaptor anytime and anywhere.

The wireless power transfer is categorized by an Inductive Power Transfer System (IPTS) method used for wireless charge, a Coupled Magnetic Resonance System (CMRS) method to be used for an electric vehicle, a high-speed train, etc., and a long distance microwave method using space solar power, which is an ongoing project.

Recently, there is a demand for applying such technique to a display apparatus such as a TV to remove the complexity of wires in terms of interior design.

Such technique may be applied to a TV without change, but considering the characteristic of a TV, a wall-mounted TV can be installed in various manners and in various spaces depending on a user. Therefore, it becomes difficult to transmit stable power.

SUMMARY

One technical task of the present disclosure is to provide an electronic apparatus such as a DTV for receiving power regardless of a distance from a peripheral apparatus and maintaining target power constantly, a display apparatus, an operational method thereof.

According to an exemplary embodiment, there is provided a display apparatus including a resonance circuit unit configured to receive power by using an inductive electromotive force through magnetic field generated by an external apparatus including a high-frequency operating inverter and a transmission coil (or a first coil unit), a rectifier configured to rectify an output voltage of the resonance circuit unit, and a converter configured to vary a frequency and a duty based on a target voltage and duty data determined in accordance with a distance from an external apparatus and output the rectified output voltage of the rectifier as the target voltage.

The converter may change an effective resistance value of a load resistance connected to the converter by varying the frequency and the duty, and adjust the rectified output voltage to the target voltage to output.

The converter may be a topology transformable DC-DC converter in a half-bridge type of in a full-bridge type to output a constant target voltage based on a variation of a receiving voltage depending on a distance being large (e.g. 100V to 400V). Based on the receiving voltage being large (e.g. 250V to 400V), the converter may operate in a half-bridge method, and based on the receiving voltage being small (e.g. 100V to 250V), operate in a full-bridge method.

The display apparatus may further include a processor configured to, based on the distance being within a predetermined distance and an internal resistance of the converter exceeding a threshold value, operate the converter at a predetermined frequency and a predetermined duty, and request the external apparatus to change an operating frequency and a duty of an inverter.

According to an exemplary embodiment, there is provided an electronic apparatus including an interface unit configured to process at least one of a video signal and(or) an audio signal while being operable in association with a display apparatus, an inverter configured to operate at an operating frequency determined in accordance with a distance from the display apparatus and change a DC voltage input from an outside into an AC voltage, and a second coil unit configured to receive magnetic field generated by the AC voltage from the display apparatus and generate an inductive electromotive force.

The electronic apparatus may include a peripheral apparatus disposed near the display apparatus.

The electronic apparatus may include a processor configured to measure the distance during initial driving of the electronic apparatus, and operate the inverter at an operating frequency corresponding to the measured distance.

The processor may be configured to measure the distance using a down-scanning method that reduces an operating frequency or using an up-scanning method that increases an operating frequency.

The processor may identify a resonance point based on a maximum value among values sensed by using the up-scanning method, determine a distance based on the resonance point, and determine a predetermined (optimal) operating frequency/duty of an inverter.

The electronic apparatus may further include a ZVS element provided between an output end of the inverter and a resonance coil, and configured to perform a zero voltage switching (ZVS) operation of a plurality of switching elements included in the inverter based on the distance exceeding a threshold value.

The electronic apparatus may perform down-scanning or up-scanning while a parallel capacitor is connected to a series resonance circuit of a power receiving unit to prevent a no-load condition of the power receiving unit included in the display apparatus.

The electronic apparatus, during up-scanning, may scan an input voltage of the inverter by applying a voltage lower than a voltage necessary for a maximum load operation reference of a power receiving unit included in the display apparatus, or by setting a duty of the inverter to a low level and lowering an effective input voltage of the inverter.

The electronic apparatus may perform an initial scanning operation in a state where a switch between a receiver-converter included in the display apparatus and load is turned off, and perform normal wireless power transmission in a state where the switch is turned on.

According to an exemplary embodiment, there is provided a method for driving a display apparatus including generating a voltage by using an inductive electromotive force generated by an external apparatus, rectifying an output voltage of a resonance circuit unit, and varying a frequency and a duty of a receiver-converter based on a target voltage and duty data of an inverter determined in accordance with a distance from the external apparatus and outputting the rectified output voltage of a rectifier as the target voltage.

The outputting may comprise changing an effective resistance value of a load resistance connected to the converter through duty/frequency variance of the converter and generating the rectified output voltage as the target voltage to output.

The converter may perform DC-DC converting.

The method may further include operating the inverter in a half-bridge method based on the distance being out of a predetermined distance, and operating the inverted in a full-bridge method based on the distance within the predetermined distance.

The method may further include operating the converter at a predetermined duty based on the distance being within a predetermined distance and an internal resistance of the converter exceeding a threshold value, and requesting the external apparatus to change an operating frequency/duty of an inverter.

According to an exemplary embodiment, there is provided a method for driving an electronic apparatus including processing at least one of a video signal or an audio signal while being operable in association with a display apparatus, operating at an operating frequency/duty determined in accordance with a distance from the display apparatus and changing a DC voltage input from an output into an AC voltage, and generating an inductive electromotive force in the display apparatus by using the AC voltage.

BRIEF DESCRIPTION OF THE DRAWINGS

FIG. 23 is a flowchart showing a process for driving an electronic apparatus according to a second example embodiment of the present disclosure, and a distance measuring process.

DETAILED DESCRIPTION OF EXEMPLARY EMBODIMENTS

Hereinafter, embodiments of the present disclosure will be described with reference to drawings.

Figure 1:
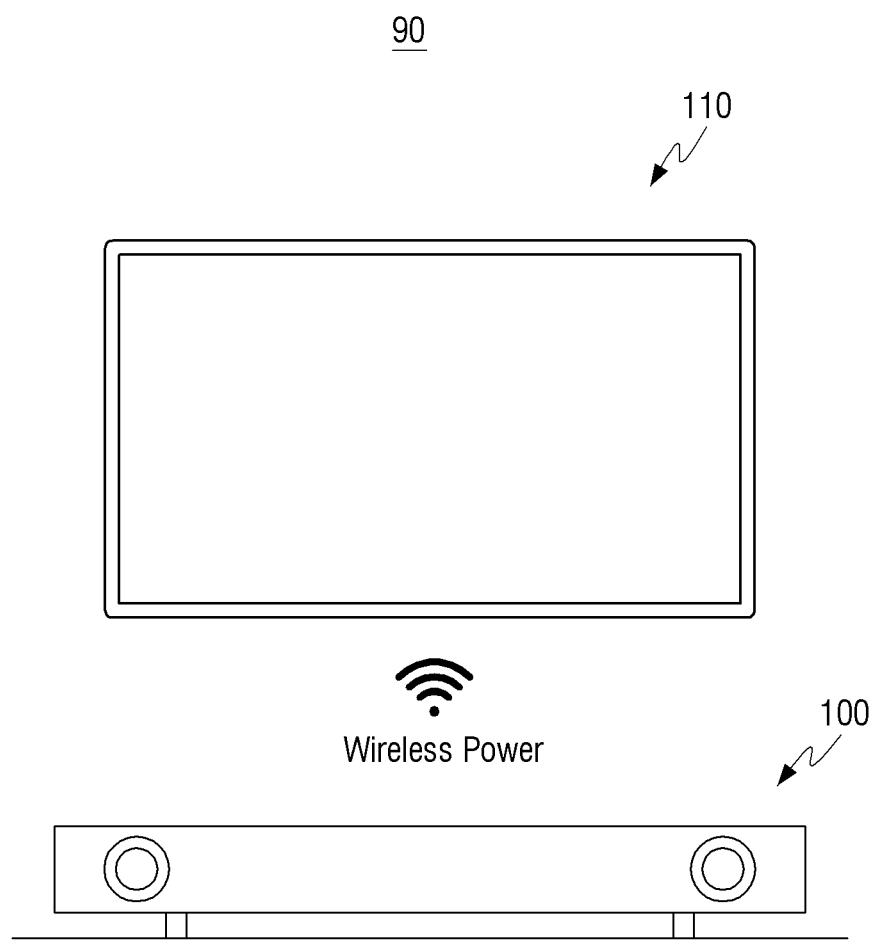
FIG. 1 is a view illustrating an image processing system capable of transmitting and receiving wireless power according to an embodiment of the present disclosure.

FIG. 1 is a view illustrating an image processing system capable of transmitting and receiving wireless power according to an embodiment of the present disclosure.

Referring to FIG. 1, an image processing system 90 according to an embodiment of the present disclosure may include a sound output apparatus 100 and a display apparatus 110.

The sound output apparatus 100 may include a wireless power transmission apparatus according to an embodiment of the present disclosure. The sound output apparatus 100 may be a peripheral apparatus disposed in the vicinity of the display apparatus 110, and replaced with various apparatuses such as a set-top box (STB), a BD reproducer, an access point (AP), etc. The sound output apparatus 100 may be connected to power plug where a power line provides commercial power (e.g. commercial power ranging from 85V to 265V), and the sound output apparatus 100 may convert the commercial power into a voltage required for the display apparatus 110 and stably transmit the voltage to the display apparatus 110. According to an embodiment of the present disclosure, it is preferable that the display apparatus 100 uses power of DC 200V and 150 W.

The display apparatus 110 may be disposed from the sound output apparatus 100 by a predetermined distance (e.g. within a range between 10 cm and 70 cm) so that power may be efficiently transmitted in a specific space. The sound output apparatus 100 may perform initial driving for transmitting power to the display apparatus 110 according to a distance (d) between two apparatuses. In other words, the sound output apparatus 100 may perform a setting operation process between two apparatuses.

In other words, the sound output apparatus 100 may measure a distance between two apparatuses, and as a result of measurement, if the measured distance is within a predetermined range, i.e. a threshold distance, may perform an operation in connection with the display apparatus 110. However, if the measured distance is too short, voltage gain between the transmission unit and the receiving unit may be reduced by a frequency splitting phenomenon. The sound output apparatus 100 may notify the display apparatus 110 that the voltage gain is reduced, and the display apparatus 110 may adjust a duty ratio of a DC/DC converter which operates in a PWM method to compensate the reduced voltage gain. The detailed description thereof will be made later. If the measured distance is too short, the sound output apparatus 100 may use a Convertible High-Frequency Inverter driving method instead of adjusting a frequency/duty ratio. For example, a half-bridge inverter may be changed into a full-bridge inverter.

The display apparatus 110 may include a wireless power receiving apparatus. The wireless power receiving apparatus may receive power transmitted wirelessly from the wire power transmission apparatus and operate the display apparatus 110. The wireless power receiving apparatus may adjust a duty ratio when PWM control of a DC/DC converter is performed according to a distance from the wireless power transmission apparatus.

As a distance between two apparatuses is reduced, output characteristic may vary due to the increased mutual inductance and the reduced leakage inductance between a first coil unit and a second coil unit, so that desired target power transmission may become impossible. Therefore, the display apparatus 110 may adjust a duty/frequency of a converter to achieve target power by varying a resistance value of a load resistance (or an effective resistance). When it is determined that the distance between the two apparatuses is too short, and target power cannot be achieved simply by changing the duty/frequency, and a converter may be driven using a full-bridge method, not a half-bridge method. As such, if it is determined that control cannot be performed even by using such driving methods, it may be requested to change the operating frequency of the inverter by the sound output apparatus 100 so that gain may increase while the display apparatus operates with the specified frequency/duty.

In relation to how to adjust the duty, it is possible to simply perform the duty change by sensing the voltage output from the rectifier and comparing the sensed voltage with the pre-stored target voltage. The pre-stored voltage value refers to a predetermined value by an experiment, or the like. In addition, in terms of a method for driving a converter, it is possible to determine the distance between two apparatuses in accordance with the voltage value sensed by voltage sensing, and thus a driving method can also be controlled based on the determination result. Therefore, according to an embodiment of the present disclosure, the above operations are not particularly limited as to what manner of operation is to be performed.

In addition, by designing the input voltage range of the DC/DC converter to operate at as a small effective resistance point as possible, rather than a large effective resistance point, the wireless power receiving unit may be capable of high efficiency operation and constant power control in a wide range of distances even when the distance is short.

As described above, an image process system 90 according to an embodiment of the present disclosure may stably transmit power regardless of the distance between the wireless power transmission apparatus and the wireless power receiving apparatus.

Figure 2:
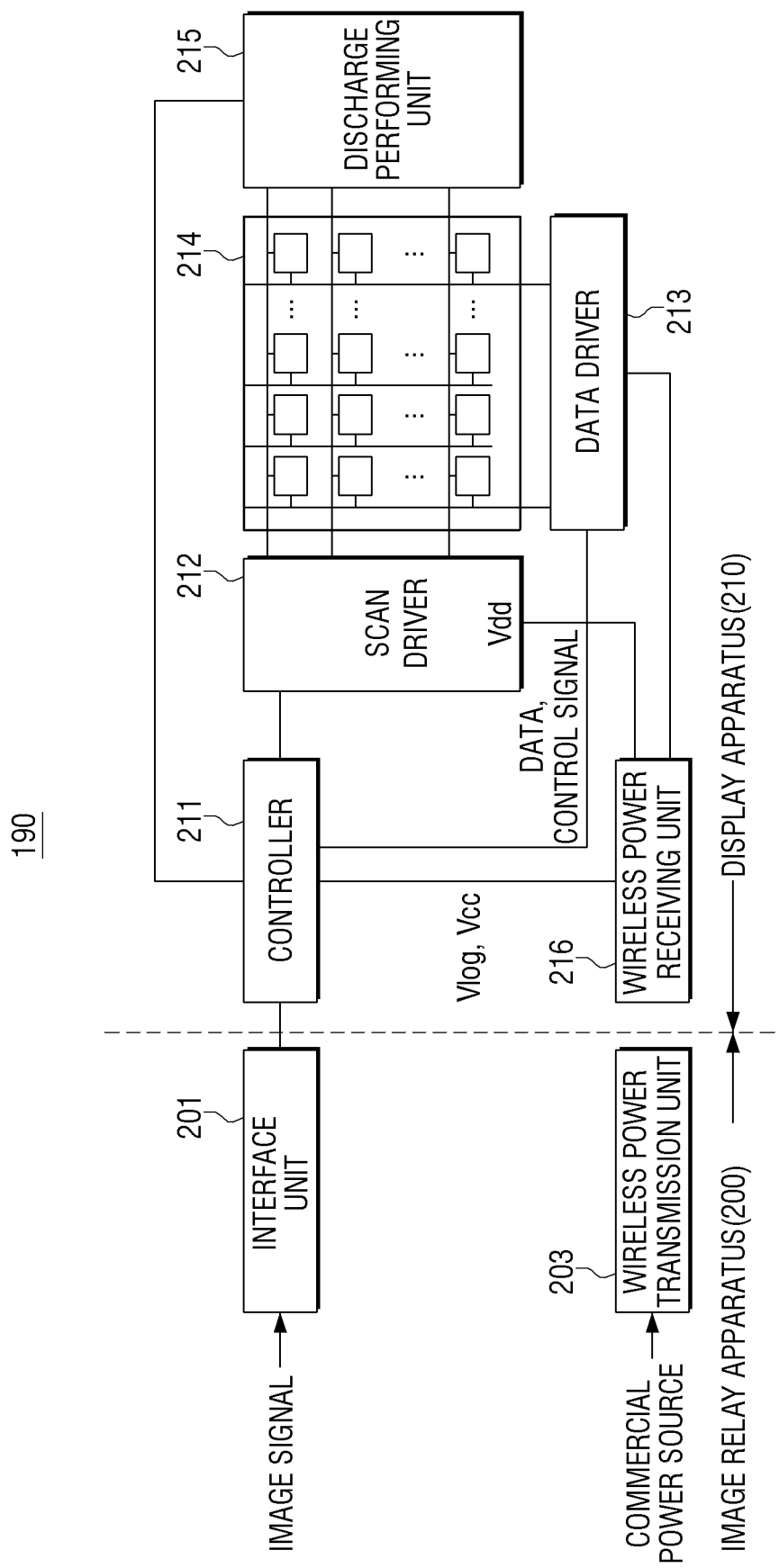
FIG. 2 is a view illustrating an image processing system according to another embodiment of the present disclosure.

FIG. 2 is a view illustrating an image processing system according to another embodiment of the present disclosure.

Referring to FIG. 2, an image processing system 190 according to another embodiment of the present disclosure may include an image relay apparatus 200 and a display apparatus 210.

The image relay apparatus 200 may be a peripheral apparatus such as a set-top box (STB), a Blue-ray (BD) reproducer, or a relay apparatus (e.g. AP). When the image relay apparatus 200 fails to perform an image processing operation, but serves to receive commercial power and transmit the power to the display apparatus 210, the image relay apparatus 200 may be referred to as a power transmission apparatus.

The image relay apparatus 200 may include an interface unit 201 and a wireless power transmission unit 203 as a set-top box.

The interface unit 201 may convert image data input from an outside to correspond to resolution of the display apparatus 210 and output the data as an image board such as a graphic card. The image data may be video data of R, G and B of 8 bits or more, the interface unit 210 may generate control signals such as a clock signal (DCLK), a vertical synchronization signal Vsync, and a horizontal synchronization signal Hsync, which correspond to the resolution of the display apparatus 210. The interface unit 201 may provide the vertical/horizontal synchronization signals and the image data to the controller 211. Data may be wirelessly transmitted from the interface unit 201 to the controller 211, but also may be transmitted in a wired manner, for example, using a USB cable. Therefore, an embodiment of the present disclosure is not limited thereto.

Further, the interface unit 201 may include a tuner for receiving a specific broadcasting program provided by a broadcasting station, a demodulator for demodulating image signals input by the tuner, a demultiplexer for separating the demodulated image signal into video/audio data and additional information, a decoder for decoding the separated video/audio data, an audio processing unit for converting the decoded audio data into a format suitable for a speaker, and a controller (e.g. MCU) for controlling the overall operations thereof.

The wireless power transmission unit 203 may generate a voltage required for the display apparatus 210 by using commercial power within a range from 85V to 265V. In addition, the wireless power transmission unit 203 may transmit the generated voltage to the display 210, more specifically, to the wireless power receiving unit 216 wirelessly. Power transmission means that power of the wireless power transmission unit 203 is generated or changed rather than that actual information is transmitted. For example, it is the same principle that an inductive electromotive force is generated in the second coil when a current flows in the first coil (or an inductor) of an electric transformer.

The wireless power transmission unit 203 may perform an operation depending on the position where the image relay apparatus 200 and the display apparatus 210 are installed by a user. That is, the wireless power transmission unit 203, if the wireless power transmission unit 203 and the wireless power receiving unit 216 are within a predetermined range, may transmit a first voltage to the wireless power receiving unit 216, and if both are output of the range, may transmit a second voltage.

The display apparatus 210 may include a controller 211, a scan driver 212, a data driver 213, a display panel 214, a discharge performing unit 215 and a wireless power receiving unit 216.

The expression "including part or all" means that the scan driver 212 and/or the data driver 213 may be combined with (e.g. a COG method) or integrated with (e.g. AMOLED, etc.) the display panel 214, or the discharge performing unit 215 may be omitted to form the display apparatus 210. However, it will be assumed that the display apparatus 210 includes all of the above components to convey full interpretation of the present disclosure.

The controller 211 may generate control signals for controlling the scan driver 212 and the data driver 213 to display image data of RGB input through the interface unit 201 on the display panel 214. The controller 211 may express the grayscale information of R, G, and B data using a logic voltage Vlog provided by the wireless power receiving unit 216. For example, when the grayscale information of R is generated by using a logic voltage of 3.3 V, 8-bit information '10001001' may be generated by expressing 3.3V as 1 and 0V as 0.

The controller 211 may generate a gate shift clock (GSC) signal, a gate output enable (GOE) signal, and a gate start pulse (GSP) signal as gate control signals for controlling the scan driver 212. The GSC signal may be a signal for determining a time when a switching element connected to a light emitting element such as R, G, and B LED (or OLED) is turned on/off, the GOE signal may be a signal for controlling the output of the scan driver 212, and the GSP signal may be a signal that indicates the first driving line of a screen from one vertical synchronization signal.

The controller 211 may also generate a source sampling clock (SSC) signal, a source output enable (SOE) signal, and a source start pulse (SSP) signal as a data control signal. The SSC signal may be used as a sampling clock for latching data in the data driver 230, and the SOE signal may transfer the data latched by the SSC to the display panel 214. The SSP signal may be a signal for notifying the start of data latching or sampling during one horizontal synchronization period.

More specifically, if the data driver 213 is formed of an IC of the Texas Instruments TCL 5958 series, for example, the controller 211 according to an embodiment of the present disclosure may process data signals, serial data shift clock (S CLK), LAT, and grayscale (GS) pulse width modulation (PWM) reference clock (G CLK) with the IC. The data signal may be grayscale data of R, G, and B. The S CLK signal may be a signal for shifting data input to the data driver 213 to a shift register (e.g. 48-bit common shift register (MSB)) in synchronization with the rising edge of the S CLK. The data stored in the shift register may be shifted from each S CLK rising edge to the MSB.

The LAT may be a signal for latching data at the falling edge from the MSB to a memory (ex. GS data memory). The G CLK may be a signal for increasing the GS counter by one on each rising edge of G CLK for PWM control. The various signals described above can be changed, so that an embodiment of the present disclosure is not particularly limited to the above.

The controller 211 may include a control signal generation unit (not shown) and a data rearrangement unit (not shown). The control signal generation unit, if a time for displaying an image in a unit frame on the display panel 214 is 16.7 ms, may generate a control signal to display a unit frame image within a predetermined time. In addition, the data rearrangement unit may reproduce the input RGB image data to be suitable for the display panel 214. For example, the controller 211 may convert 8 bit data into 64 bit data.

The scan driver 212 may receive a gate-on voltage (Vdd) and a gate-off voltage (Vss) provided by the wireless power receiving unit 216 and apply the voltage to the display panel 214 under the control of the controller 211. However, according to an embodiment of the present disclosure, the gate-on voltage (Vdd) may be provided from a second line 1 (GL1) to a scan line N (GLn) sequentially to embody a unit frame image on the display panel 214. The scan driver 212 may operate in response to the scan signal generated by the controller 211 according to an embodiment of the present disclosure. The scan driver 212 may include a power voltage source and a switching element connected to each scan line as shown in FIG. 2. The switching element may use not only a TFT element, but also a transistor (TR) and MOSFET.

The data driver 213 may convert video data of R, G and B provided serially by the controller 211 into video data in parallel, convert digital data into an analogue current or a duty-on current (e.g. a pulse current), and provide video data corresponding to a single horizontal line on the display panel 214 for each horizontal line simultaneously and sequentially. Digital information of video data provided by the controller 211 may be converted into an analogue current including a color grayscale and the analogue current may be provided to the display panel 214. The analog current may be a pulse type current. It is preferable that the data driver 213 may also be synchronized with a gate signal provided to the scan driver 212 and output unit frame data.

Since the detailed configuration of the data driver 213 is well known to those skilled in the art and irrelevant to the gist of the present disclosure, it would be omitted. In other words, the data driver 213 may be variably configured depending on whether a light emitting element is driven with a constant current, or with a constant voltage. The Texas Instruments TLC5958 Series IC may be used for the data driver 213.

The display panel 214 may include a plurality of scan lines and a plurality of data lines intersecting with each other to define a pixel area, and light emitting elements of R, G and B such as LED (or OLED) may be provided in the pixel area where the scan lines and the data lines cross each other. When a power voltage is applied to each scan line of the display panel 214, and a current path is formed between grounds through the data driver 213, light emitting elements may generate a current corresponding to their grayscale information through the data lines connected to the scan lines to which a power voltage is supplied. The display panel 214 may display an image by adjusting brightness depending on the amount of charge flowing through a current path. The light emitting element may be driven by a constant voltage. Therefore, an embodiment of the present disclosure is not limited thereto.

The discharge performing unit 215 may discharge parasitic charge by a parasitic capacitor of each scan line to a ground when each scan line discharges. The discharge performing unit 215 may be controlled by the controller 211. The discharge performing unit 215 may be controlled between when the power voltage Vdd provided to a scan line 1 is blocked, and when a power voltage is provided to a scan line 2.

The wireless power receiving unit 216 may allow the display apparatus 210 to use constant power regardless of the distance from the wireless power transmission unit 203. Therefore, while being linked to the wireless power transmission unit 203, if the distance from the wireless power transmission unit 203 is within a predetermined range, the duty ratio of the inverter may not be changed. However, if the distance is output of the predetermined range, the duty ration may be changed. For example, if the distance between the wireless power transmission unit 203 and wireless power receiving unit 216 is too short, voltage gain may be between the transmission unit and the receiving unit may be significantly lowered. Therefore, it is preferable that the wireless power transmission unit 203 changes a driving method of the inverter.

The wireless power receiving unit 216 may generate a first voltage (e.g. DC 200V) and a second voltage (e.g. DC 13V) through a converter and provide the generated voltage to each functional block (e.g. a display panel, a driver, etc.). The wireless power receiving unit 216 may generate a voltage of DC 3.3V as a logic voltage to present a grayscale for the controller 211, and generate various magnitudes of voltages such as a voltage of DC 4.5V as a gate-on voltage Vdd for the scan driver 220.

The wireless power receiving unit 216 may generate a VCC voltage (e.g. DC13V), which is input to an IC, when the controller 211, the scan driver 212, and the data driver 213 are integrated in IC form.

Figure 3:
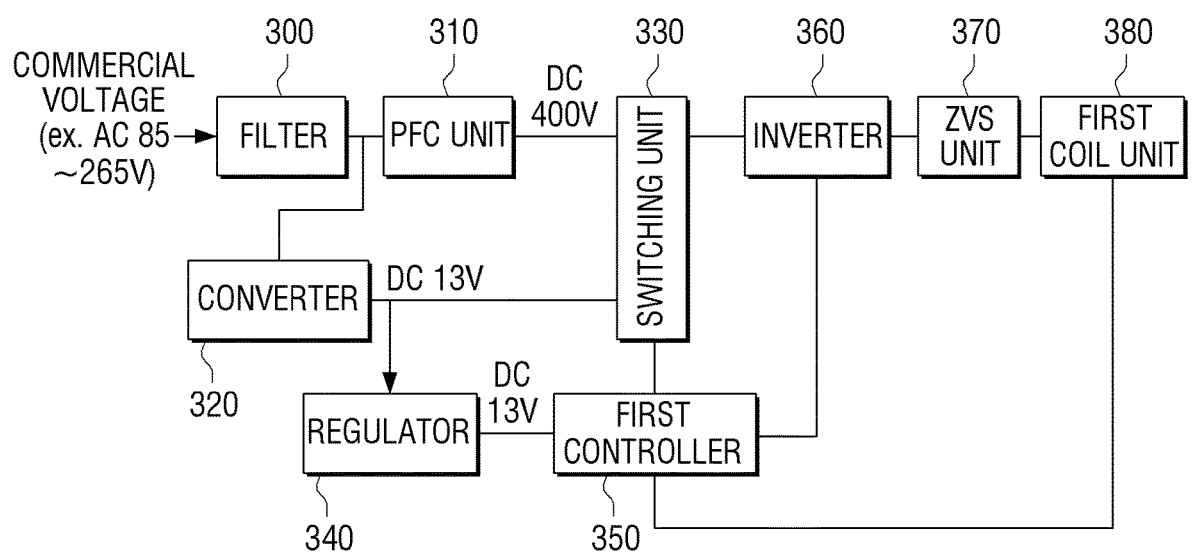
FIG. 3 is a block diagram exemplifying a detailed structure of a wireless power transmission unit shown in FIG. 2.

FIG. 3 is a block diagram exemplifying a detailed structure of a wireless power transmission unit shown in FIG. 2.

Referring to FIG. 3, a wireless power transmission unit 203 may include part or all of a filter 300, a PFC unit 310, a converter 320, a switching unit 330, a regulator 340, a controller 350, an inverter 360, a resonance circuit unit 370, and a first coil unit 380.

The wireless power transmission unit 203 may be a stand-alone type individual apparatus, and the expression "include part or all" means that some constituent elements are omitted. However, it will be assumed that the wireless power transmission unit 203 includes all of the above components to convey full interpretation of the present disclosure.

The filter 300 may rectify or smooth the input commercial power and output a DC voltage at a constant level. A half-wave or full-wave rectifier circuit may be used for rectification, and a capacitor may be connected to an output end of the rectifier circuit in parallel for smoothing.

The PFC unit 310 may change the voltage output from the filter 300 to a voltage of 400V through a converter to output. The PFC unit 310 may include a fly-back converter.

The converter 320 may be provided with a smoothing voltage output from the filter 300, generate a DC voltage of 13V, and provide the DC voltage to the switching unit 330 and the regulator 340.

The switching unit 330 may output a first voltage of DC 13V and a second voltage of DC 400V, which is selected under the control of the first controller 350.

The regulator 340 may perform an operation for proving a stable voltage to the first controller 350. The regulator 340 may allow the ripple to be improved in the output voltage.

When the image relay apparatus 220 and the display apparatus 210 of FIG. 2 are initially installed and driven, the controller 350 may measure a distance between the image relay apparatus 220 and the display apparatus 210 automatically or by a command of a system designer or a user, more specifically, a distance between the wireless power transmission unit 203 and the wireless power receiving unit 216 of FIG. 2.

The first controller 350 may control the switching unit 330 and output a voltage of DC 13V to the inverter 360. The voltage of DC 13V may be a voltage for measuring a distance. The first controller 350 may sense a current of the inverter 360 and measure a distance between two apparatuses. For example, the first controller 350 may determine whether a current value of the sensed current coincides with the stored current value, and then determine an operating frequency and a distance. In other words, since a maximum current value and an operating frequency are predetermined in accordance with a distance, a frequency corresponding to a peak of a resonance point may be found based on a current value sensed by gradually increasing the operating frequency, and the pre-stored optimal operating frequency/duty corresponding to the frequency may be set as the initial operating condition of the inverter.

The first controller 350 may perform down-scanning or up-scanning for measuring a distance. The down-scanning comprises gradually reducing the frequency while operating the wireless power transmission apparatus 203 with the maximum frequency within a predetermined range, determining the frequency at a time when a current is sensed, and determining a distance. The controller 350 may determine the distance based on the pre-stored distance information matched with the frequency. The first controller 350 may measure the distance in the up-scanning method. In other words, the up-scanning method comprises identifying a point where the current value is maximum by sequentially increasing the operating frequency within the given range, i.e. determining the distance through the determined maximum current value. In other words, the method comprises finding and determining the distance information matched with the maximum current value.

When the frequency scanning operation for measuring a distance is completed, the first controller 350 may control the switching unit 330 so that the voltage of DC 400V may be output to the inverter 360. As a result, a wireless power operation may start.

When identifying the peak of the maximum resonance point through up-scanning, damage to a resonance circuit element due to a high current at the maximum resonance point may be prevented by comprising a half-bridge type inverter without an additional switching unit 330, and driving the inverter with the lowered duty ratio for reducing the input effective voltage of the inverter. The inverter 360 may convert the input voltage of DC 400V into an AC voltage to output. For example, the inverter 360 may include a PWM circuit to enable PWM control by the first controller 350. The first controller 350 may control the inverter 360 and adjust an operating frequency and a duty-on time, and when the distance measurement is completed, the inverter 360 may operate with the determined operating frequency and duty ratio at fixed values. The PWM circuit is well-known in the art, and thus further description will be omitted. However, the inverter 360 according to an embodiment of the present disclosure includes a convertible high-frequency inverter.

The inverter 360 may drive a full-bridge type inverter or a half-bridge type inverter depending on the distance. The full-bridge type inverter may further include a switching element compared to the half-bridge type inverter. Therefore, according to an embodiment, the inverter 360 may be conveniently driven using the half-bridge method by driving switching elements corresponding to one pole in the full-bridge method.

A Zero Voltage Switching (ZVC) unit 370 may include a ZVC element (filter). Such the ZVC unit 370 may operate when a distance between the wireless power transmission unit 203 and the wireless power receiving unit 216 is small. As the distance between the wireless power transmission unit 203 and the wireless power receiving unit 216 is reduced, gain for power transmission may be reduced. As a result, the display apparatus 210 may not obtain the desired power. The zero voltage may generate when a distance (e.g.

30 cm) becomes too short, and the coil of the first coil unit 380 may be affected by the coil of the second coil unit 400, so that mutual inductance may increase, and a current may fail to flow through the first coil. As a result, power may not be properly transmitted. The ZVS unit 370 may constantly maintain the efficiency of power transmission by allowing a current to flow through the ZVS element.

The first coil unit 380 may include a coil, i.e. an inductor, a current may flow through a first coil, and thus an inductive electromotive force may be generated in the wireless power receiving unit.

Figure 4:
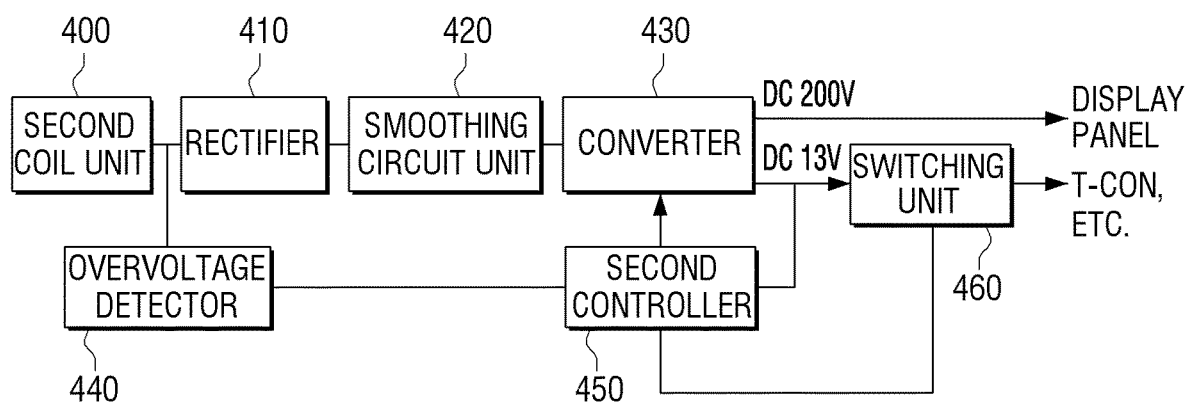
FIG. 4 is a block diagram exemplifying a detailed structure of a wireless power transmission unit shown in FIG. 2.

FIG. 4 is a block diagram exemplifying a detailed structure of a wireless power transmission unit shown in FIG. 2.

Referring to FIG. 4, the wireless power receiving unit 216 according to an embodiment of the present disclosure may include some or all of a second coil unit 400, a rectifier 410, a smoothing circuit 420, a converter 430, an overvoltage detector 440, a second controller 450 and a switching unit 460.

The expression "include part or all" means that the overvoltage detector 440 is omitted or some constituent elements are integrated with other constituent elements. However, it will be assumed that the wireless power receiving unit 216 includes all of the above components to convey full interpretation of the present disclosure.

The second coil unit 400 may include a coil, that is, an inductor, and the inductive electromotive force may be generated by a voltage applied to the first coil unit 380 of the wireless power transmission unit 203 and a current which flows through the first coil. Such inductive electromotive force may have a unit of voltage.

The rectifier 410 and the smoothing circuit 420 may rectify and smooth the AC voltage provided by the second coil unit 400 and convert the AC voltage into the DC voltage.

The converter 430 may include a DC-DC converter, and generate and output voltages of DC 200V and DC 13V. The voltage of DC 200V may be provided to drive an LED string provided in the display panel 214. The voltage of DC 13V may be used as a VCC power source of the controller 211, or the scan driver 212 and the data driver 213. PWM control may be performed on the DC-DC converter constituting the converter 430, and the duty ratio may be adjusted according to the distance.

According to an embodiment, the converter 430 may operate in three manners. In other words, when the operating frequency of the inverter 360 is determined based on the distance, the wireless power transmission unit 203 may operate with a predetermined duty without additional duty adjustment. If the operating frequency of the inverter 360 is constant regardless of the distance, the converter 430 may operate by adjusting the duty according to the distance. The converter 430 may measure the distance by sensing the current output from the converter 430 and comparing the output current with a predetermined value, and adjust the duty by using pre-stored duty information, which is matched with the measured distance. Further, when the distance is too short, it is possible to adjust the duty with changing the operating frequency of the inverter.

The overvoltage detector 440 may detect the overvoltage applied from the second coil unit 440 to the rectifier 410 and transmit the overvoltage to the second controller 450. The second controller 450 may temporarily block the voltage applied to the rectifier 410.

The second controller 450 may control the converter 430 upon the request of the wireless power transmission unit 203. For example, if it is determined that the converter unit 430 needs to adjust the duty ratio as the internal resistance increases, the second controller 450 may adjust the duty ratio nu controlling the converter 430.

The second controller 450 may maintain the switching unit 460 to be turned off so that the voltage of DC 13V may not be output during the initial driving, or the scanning operation for measuring the distance after the image replay apparatus 200 and the display apparatus 210 are installed. When it is determined that the scanning operation is completed by sensing the current output from the converter 430. The switching unit 460 may be turned on and the voltage of DC 13V may be output.

As a result, the wireless power receiving unit 216 may generate a stable voltage required by the display apparatus 210. The stable voltage may affect the image quality of the display panel 214.

Figure 5:
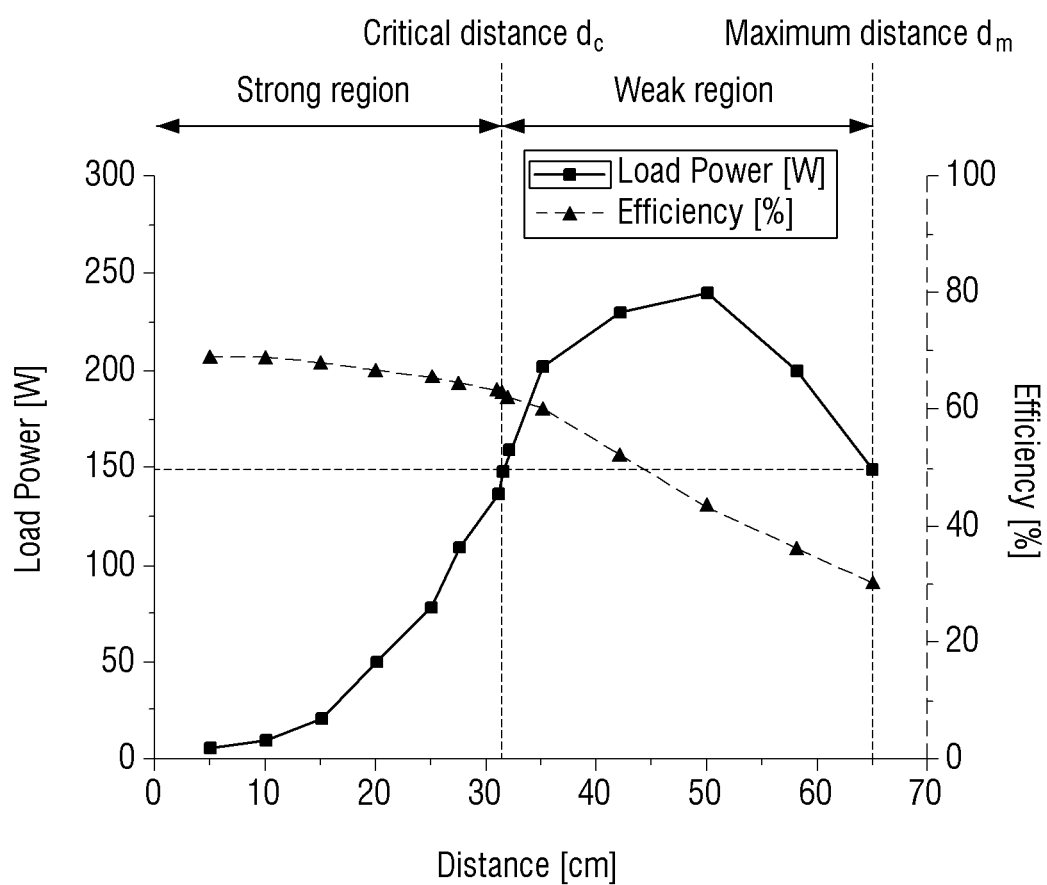
FIG. 5 is a view illustrating output power and efficiency characteristic according to a distance change of a voltage source input inductive power transfer system (IPTS)

FIG. 5 is a view illustrating output power and efficiency characteristic according to a distance change of a voltage source input inductive power transfer system (IPTS).

Referring to FIG. 5, in the state where target output power is achieved at the maximum power (dm) between the wireless power transmission unit 203 and the wireless power receiving unit 216 (e.g. dm=65 cm and target output power 150 W), when the distance (d) between the wireless power transmission unit 203 and the wireless power receiving unit 216 is reduced, output power may be increased and then reduced due to a frequency separation phenomenon.

In addition, based on d=dc, which is the same point as the target output power when the distance is reduced, d⟩dc may be a weak region, and d⟨dc may be a strong region, and the frequency separation phenomenon may significantly occur in the strong region. Such feature will be summarized as follows.

Weak region (dc⟨d⟨dm): output power⟩target power

Strong region (d⟨dc): output power⟨target power

Based on the above, according to an embodiment of the present disclosure, without an additional communication circuit between the wireless power transmission unit 203 and the wireless power receiving unit 216, output power ($P_L$) may be maintained the same as the target power when the distance between the wireless power transmission unit 203 and the wireless power receiving unit 216 changes in a wide range (in the storing region and the weak region), and high efficiency may be achieved at the same time.

When the load connected to the wireless power receiving unit 216 (e.g. home appliance such as a TV, a microwave, a computer, a monitor, etc.) fails to operate during initial driving ($R_L=\infty$), the magnitude and the phase of impedance reflected from the wireless power receiving unit 216 to the wireless power transmission unit 203 may vary depending on the distance due to a parallel capacitor Cp of the wireless power receiving unit 216 when the distance between the wireless power receiving unit 216 to the wireless power transmission unit 203 changes.

Accordingly, according to an embodiment of the present disclosure, by sensing an operating frequency at which the current magnitude of the wireless power transmission unit 203 reaches a current of a predetermined magnitude through frequency scanning in a direction to gradually reduce the operating frequency, the distance between the wireless power receiving unit 216 and the wireless power transmission unit 203 may be indirectly determined without an additional communication circuit, and the distance may also be determined through up-scanning.

As described above, constant power output control through modulation of the operating frequency for the wireless power constant power output control when the distance changes, and constant power output control through effective resistance change when the DC/DC converter 430 of the wireless power receiving unit 216 adjusts the duty have been described.

Hereinafter, the detailed description thereof will be made below.

Figure 6:
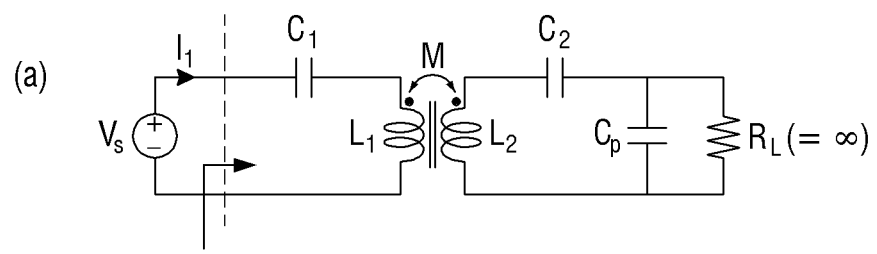
FIG. 6 is an equivalent circuit diagram of the IPTS under initial condition before load operation (RL=∞)
Figure 6:
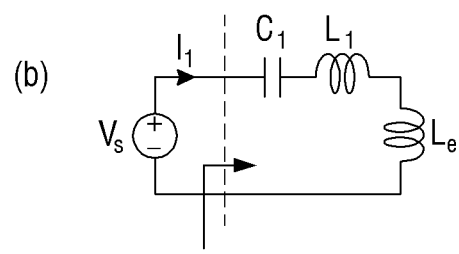
Figure 7:
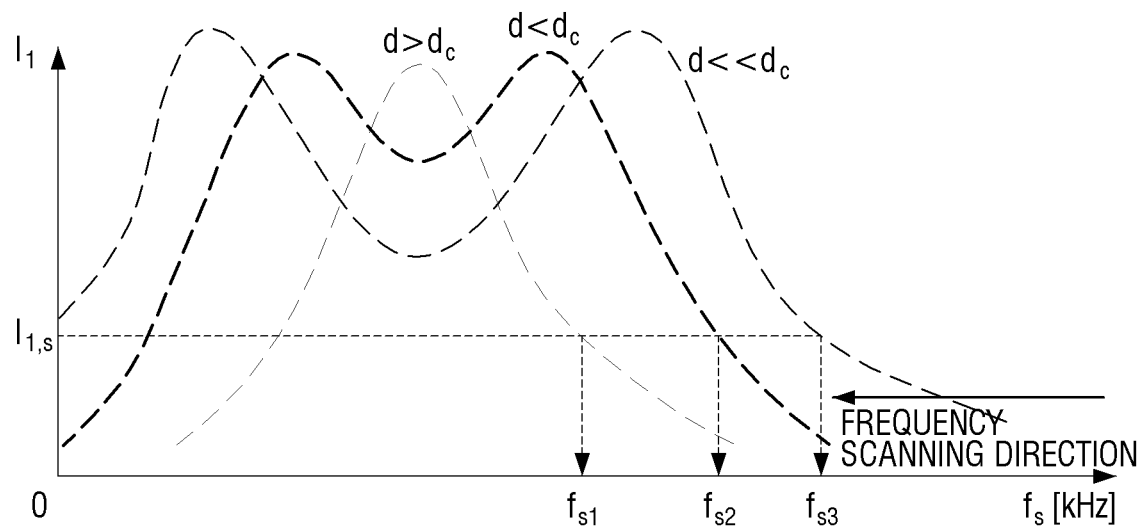
FIG. 7 is a view showing an example of frequency scanning for determining a distance between a transmission unit and a receiving unit during initial driving.

FIG. 6 is an equivalent circuit diagram of the IPTS under an initial condition before load operation (RL=∞), and FIG. 7 is a view showing an example of frequency scanning for determining a distance between a transmission unit and a receiving unit during initial driving.

According to an embodiment of the present disclosure, a distance between the wireless power transmission unit 203 and the wireless power receiving unit 216 through frequency scanning may be determined by the first controller 350 of FIG. 3.

When the distance between the wireless power receiving unit 216 and the wireless power transmission unit 203 changes, the resonance point of the impedance from the wireless power transmission unit 203 to the wireless power receiving unit 216 may be changed (refer to circuit diagram (a) of FIG. 6), so that the magnitude of the current of the wireless power transmission unit 203 may vary depending on the operating frequency (refer to circuit diagram (b) of FIG. 6). Circuit diagrams (a) and (b) of FIG. 6 are respectively expressed by <Equation 1> and <Equation 2> as follows.

$$2\pi\sqrt{C_1(L_1 + L_e(M))} \quad \text{[Equation 1]}$$

$$L_e(M) = \left(L_2 + \frac{C_2 + C_p}{\omega_s^2 C_2 C_p}\right) \frac{(\omega_s M)^2}{\omega_s^2 L_2^2 + \left(\frac{C_2 + C_p}{\omega_s C_2 C_p}\right)^2} \quad \text{[Equation 2]}$$

According to an embodiment of the present disclosure, by adding the parallel capacitor (Cp) to the wireless power receiving unit 216, during the initial driving ($R_L = \infty$), the wireless power receiving unit 216 may be equivalently self-coupled to the wireless power transmission unit 203.

The distance between the wireless power transmission unit 203 and the wireless power receiving unit 216 during the initial driving may be determined by measuring an operating frequency (e.g. fs1, fs2, fs3, etc.) at which a current $I_1$ of the wireless power transmission unit 203 reaches a current $I_{1,s}$ of a predetermined magnitude (refer to FIG. 7). This feature refers to a down-scanning method according to an embodiment of the present disclosure.

Since the distance for each operating frequency where $I_1$-$I_{1,s}$ is pre-stored in the wireless power transmission unit 203 (in the storage such as DB), the distance corresponding to the sensed operating frequency may be indirectly determined.

The wireless power transmission unit 203 may use an up-scanning method in addition to a down-scanning method for measuring a distance. For the up-scanning, the wireless power transmission unit 203 may apply a voltage of 13V during scanning and identify the weak/storing region by using frequency information corresponding to a peak point of the first resonance frequency, that is, a point at which a current value is maximum.

During the up-scanning operation, at the highest peak, although scanned at a voltage of 13V, a relatively high voltage of 60V to 70V may be applied to the wireless power receiving unit 216, so that the receiving unit board or the LED may be operated. Therefore, the DC-DC converter 430 may operate in the area ranging from 100V to 400V, and the MCU of the wireless power receiving unit 216, i.e. the second controller 450 may output a voltage of 13V when operating within a normal input voltage range of DC-DC output. Therefore, when a normal voltage is output and power becomes stable, the switching unit 460 may be turned on or turned off.

After scanning is completed, the wireless power transmission unit 203 may transmit power of 150 W when a voltage of 400V is applied.

In addition, in the strong region, by dividing the step into several steps, and operating the inverter 360 with the pre-calculated optimal duty value of each region, the optimum efficiency may be achieved by not supplying excess power to the wireless power receiving unit 216 more than necessary.

A switching circuit may be turned off to protect an apparatus when an overvoltage (or an overcurrent) is applied, and may perform additional functions to protect the load.

Figure 8:
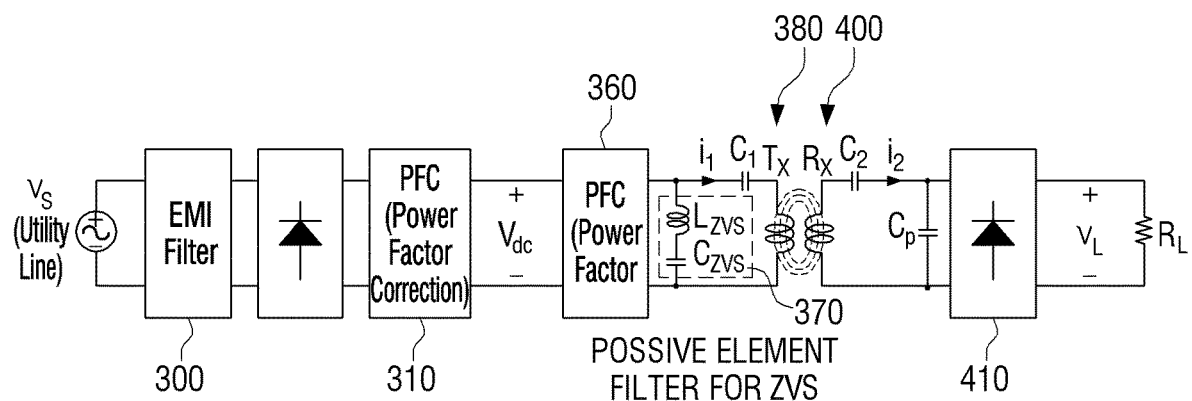
FIG. 8 is an overall circuit diagram of an IPTS to which constant power output control through frequency variation is applied.
Figure 9:
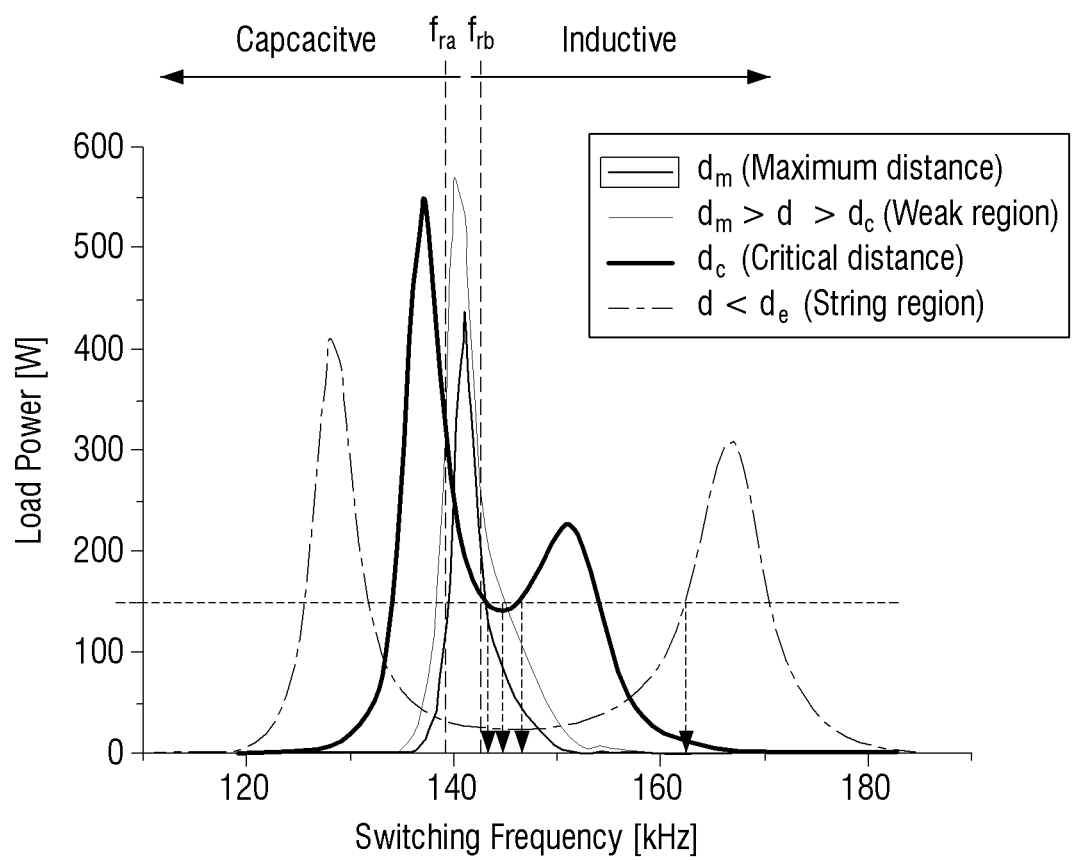
FIG. 9 is a view showing output power characteristics at operating frequency changes.
Figure 10:
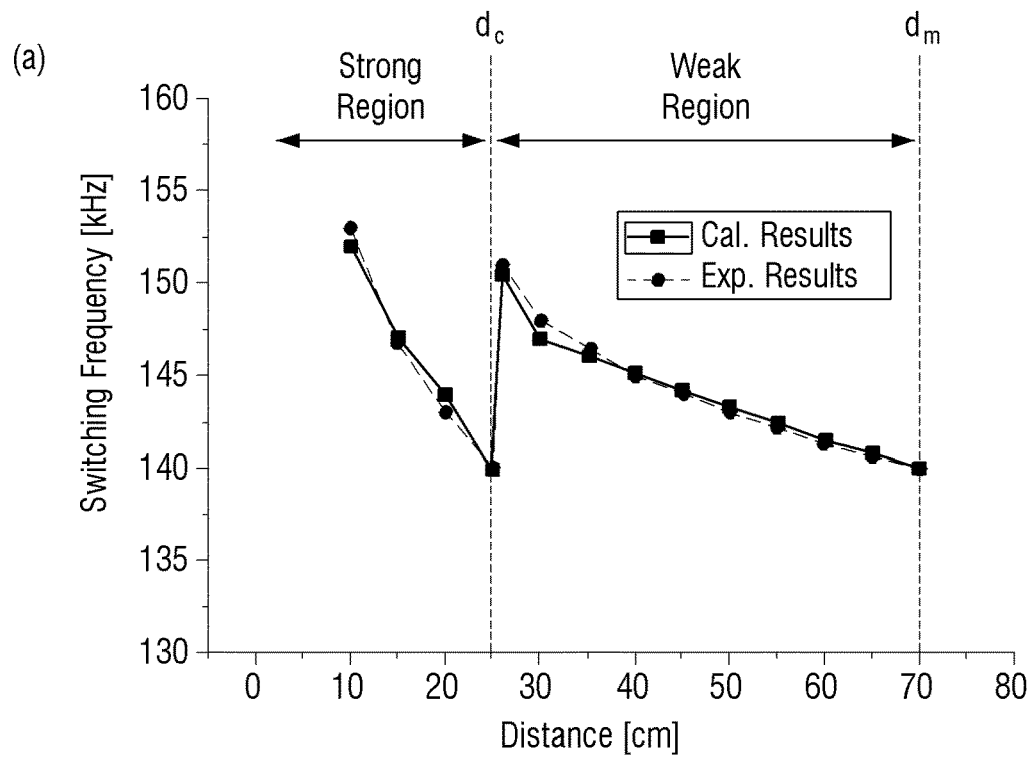
FIG. 10 is a diagram showing an operating frequency that satisfies target power when a distance between a transmission unit and a receiving unit changes, and the efficiency thereof.
Figure 10:
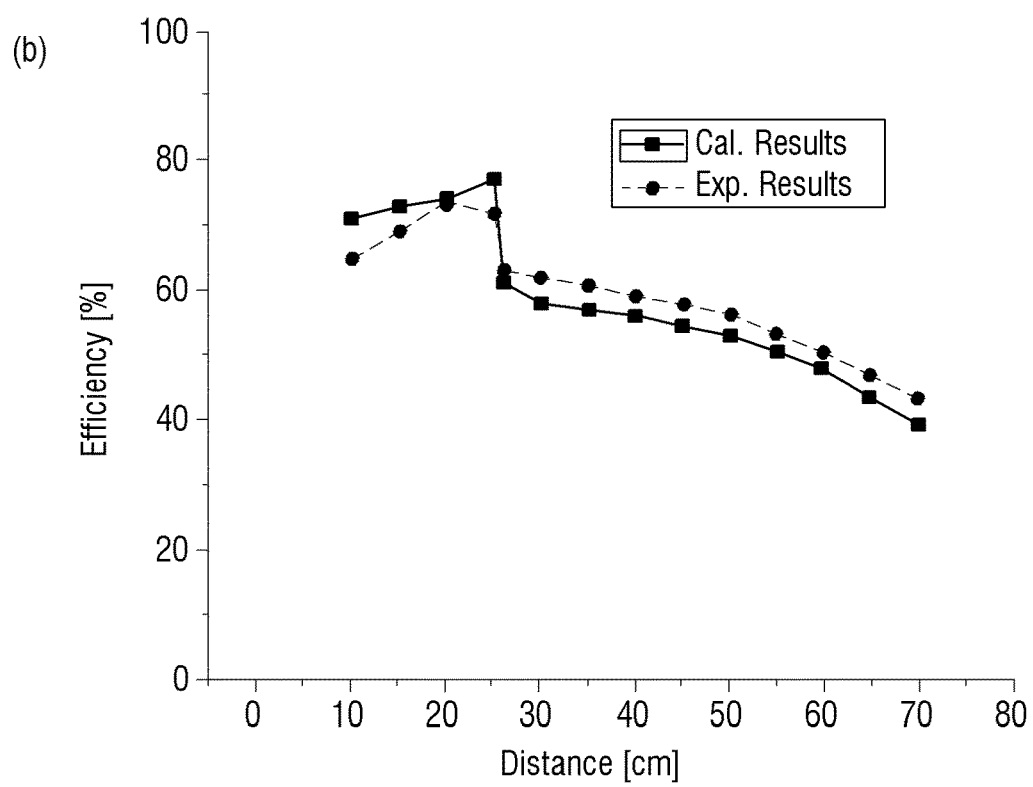

FIG. 8 is an overall circuit diagram of an IPTS to which constant power output control through frequency variation is applied, FIG. 9 is a view showing output power characteristics at operating frequency changes, and FIG. 10 is a diagram showing an operating frequency that satisfies target power when a distance between a transmission unit and a receiving unit changes, and the efficiency thereof.

FIG. 9 shows that there is an operating frequency which satisfies target power by distance (ex. $P_L$=150 W) between the wireless power transmission unit 203 and the wireless power receiving unit 216 by changing the operating frequency under the control of the inverter 360 as shown in FIG. 8.

In the weak region (frequency separation), there may be two target power satisfaction points, and in the storing region, there may be four target power satisfaction points. Therefore, in the weak region, the first frequency from the left side (capacitive region) may be a hard switching section, the inverter 360 may operate at the second frequency (inductive region). In the strong region, since the first or second frequency from the left side (capacitive region) is a hard switching section, the inverter 360 may operate at the third or fourth frequency (inductive region).

After the distance is determined in accordance with initial frequency scanning, constant power output control may become possible while operating with a frequency that satisfies target power (refer to FIG. 10).

In addition, for the ZVS operation of the high-frequency operation inverter 360, the frequency in the inductive region of FIG. 9 may be used.

In this case, in the storing region, there may be a section where an inductive current for performing the ZVS operation is short in the inductive region, by applying a manual element (filter) for the ZVS operation to the output end of the inverter 360, the ZVS operation may be guaranteed.

Figure 11:
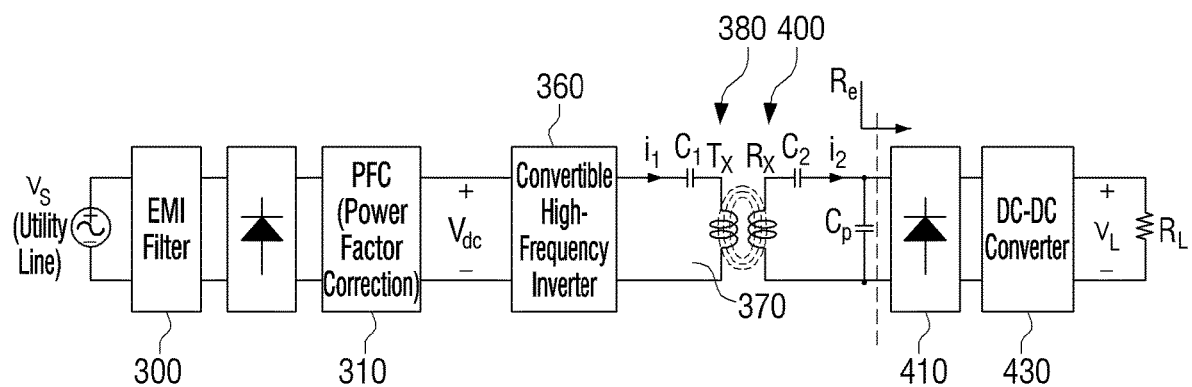
FIG. 11 is an overall circuit diagram of an IPTS to which constant power output control is applied using a DC-DC converter.
Figure 12:
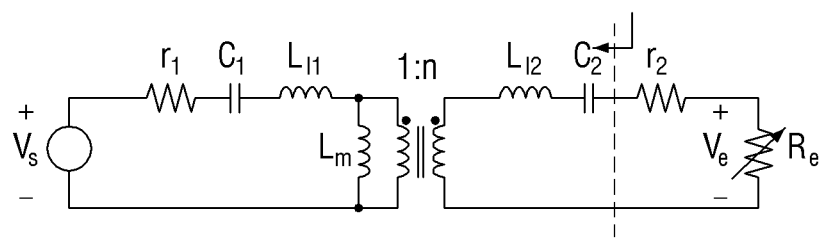
FIG. 12 is an equivalent modeling circuit diagram of an effective resistance change applicable circuit diagram (assuming Cp=0 μF)
Figure 13:
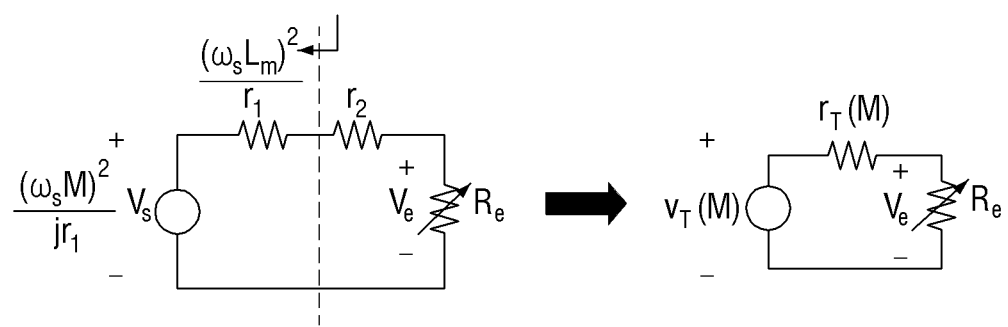
FIG. 13 is a final equivalent circuit diagram when assuming a transmission unit and a receiving unit are fully resonant.
Figure 14:
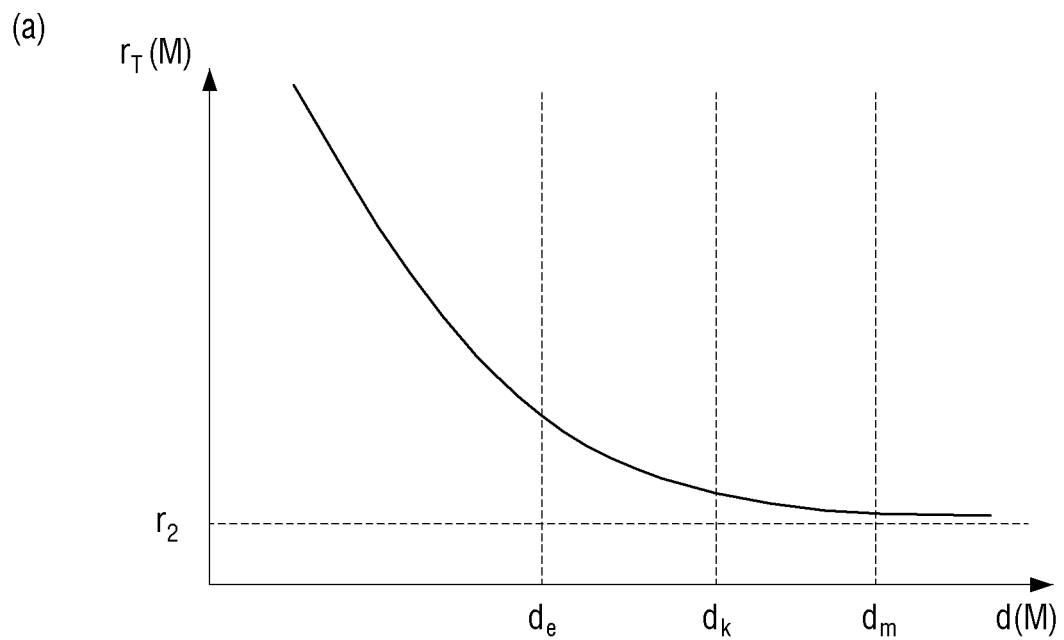
FIG. 14 is a view showing internal resistance characteristic and output power characteristic in accordance with an internal resistance change when a distance between a transmission unit and a receiving unit changes.
Figure 14:
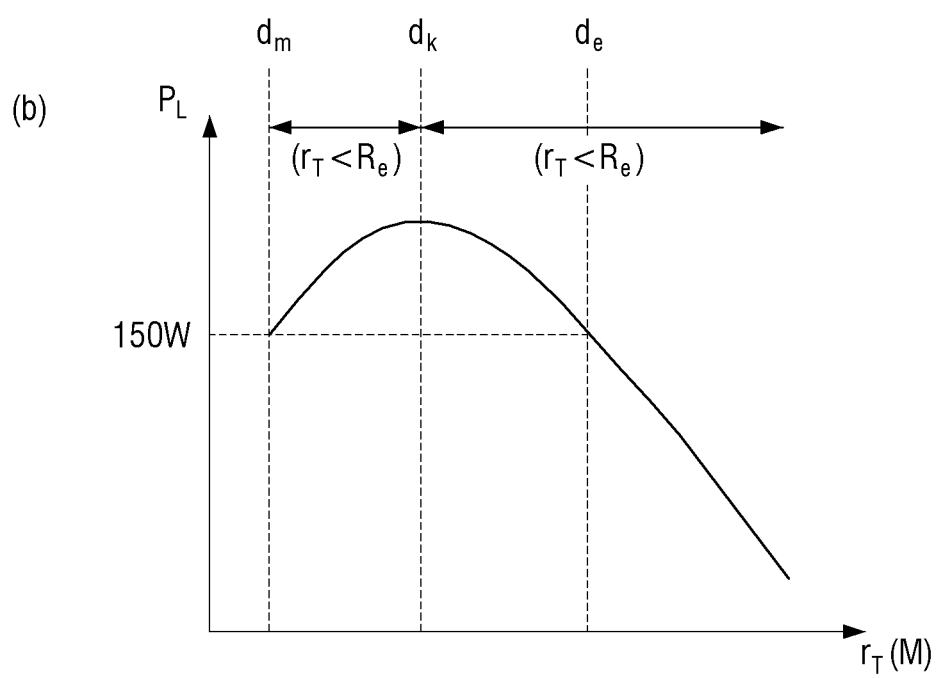

FIG. 11 is an overall circuit diagram of an IPTS to which constant power output control is applied using a DC-DC converter, FIG. 12 is an equivalent modeling circuit diagram of an effective resistance change applicable circuit diagram (assuming Cp=0 μF), FIG. 13 is a final equivalent circuit diagram when assuming a transmission unit and a receiving unit are fully resonant, and FIG. 14 is a view showing internal resistance characteristic and output power characteristic according to an internal resistance change when a distance between a transmission unit and a receiving unit changes.

Referring to FIG. 11, constant power output control may be possible in accordance with an effective resistance change when the DC-DC converter's duty of the wireless power receiving unit 216 varies.

In other words, when the distance between the wireless power transmission unit 203 and the wireless power receiving unit 216 is reduced, an internal resistance $r_T$ may gradually increase (refer to FIGS. 12 and 13). Referring to FIG. 13, a final equivalent circuit in the complete resonance of the wireless power transmission unit 203 and the wireless power receiving unit 216 is expressed by Equation $$V_T \equiv \frac{\omega_s M}{jr_1} V_s, \text{ and } r_T(M) \equiv \frac{(\omega_s M)^2}{r_1} + r_2,$$

and thus an overcharge η is expressed by <Equation 3> as follow.

$$X_r(R_e)X_m^2 + X_r(R_e) \qquad \text{[Equation 3]}$$

Therefore, (leakage reactance) $X_m \equiv \omega_S M$, (magnetizing reactance) $X_r = r_1(r_2 + R_e)$.

As such, since the internal resistance increases, according to an embodiment of the present disclosure, constant power output control may be possible by varying an effective resistance Re of output side (refer to FIG. 14).

FIG. 14 is explained as follows.

dm⟩d(M)⟩dk section: $r_T$⟨Re, output power is reduced when Re is increased.

dk⟨d(M) section: $r_T$⟩Re, output power is increased when Re is increased.

Figure 15:
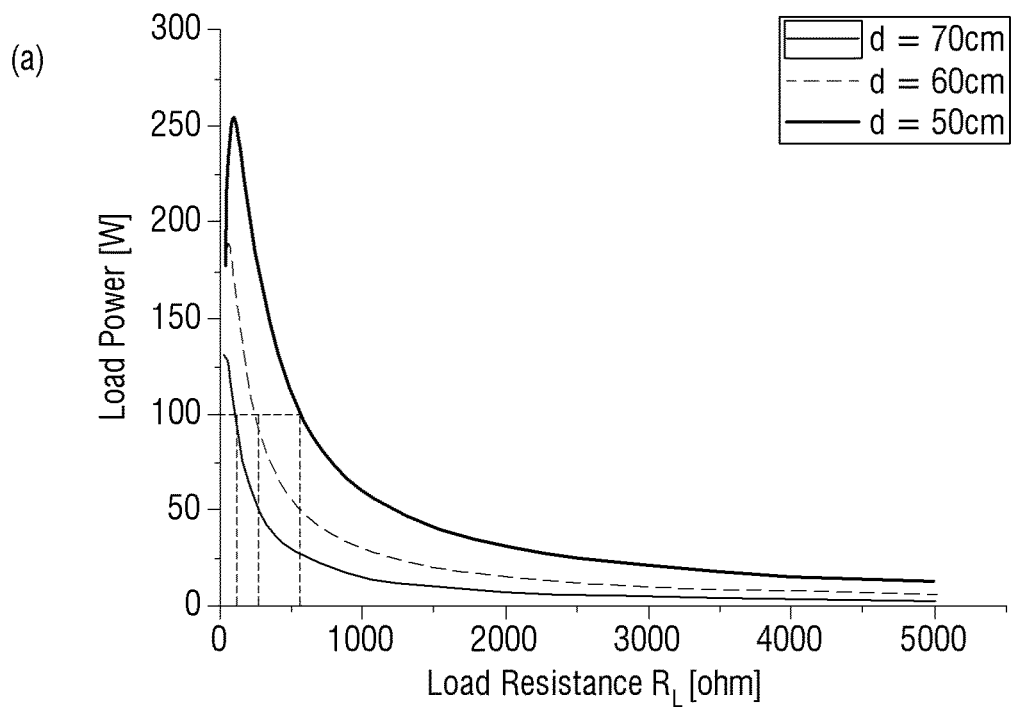
FIGS. 15 to 17 are views illustrating an efficiency graph by load resistance for target power satisfaction when a distance between a transmission unit and a receiving unit changes.
Figure 15:
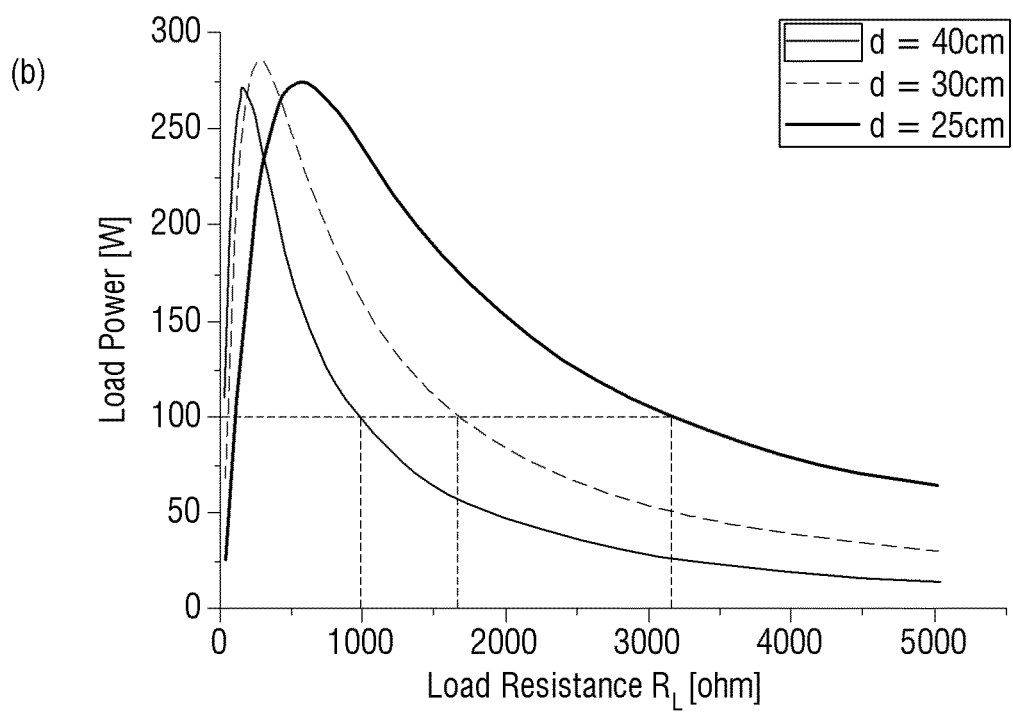
Figure 16:
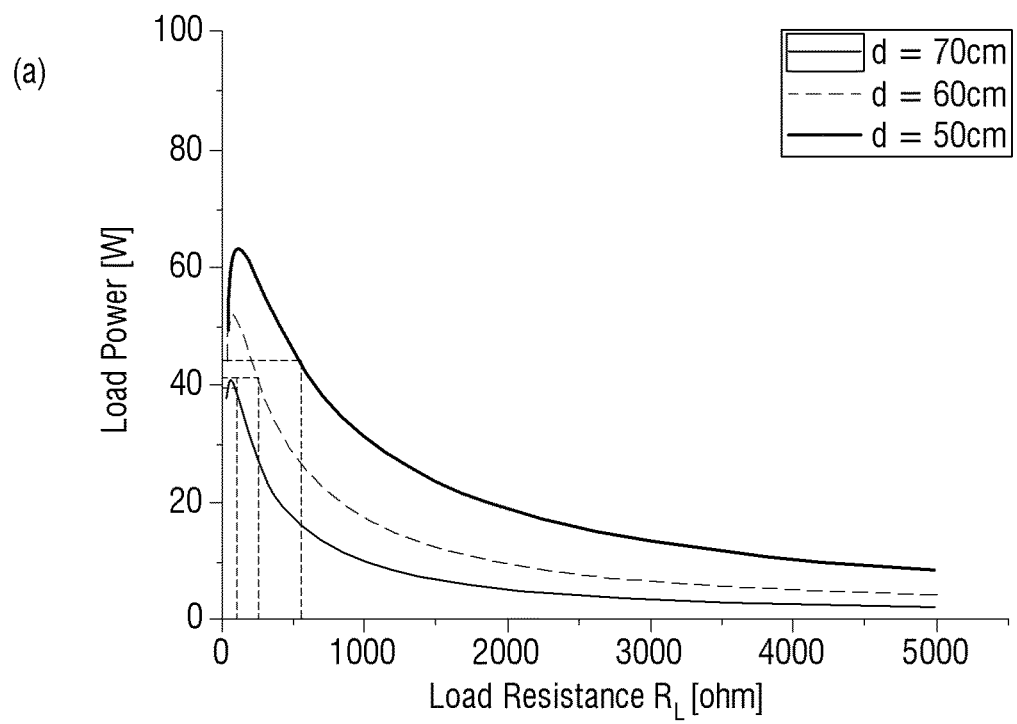
Figure 16:
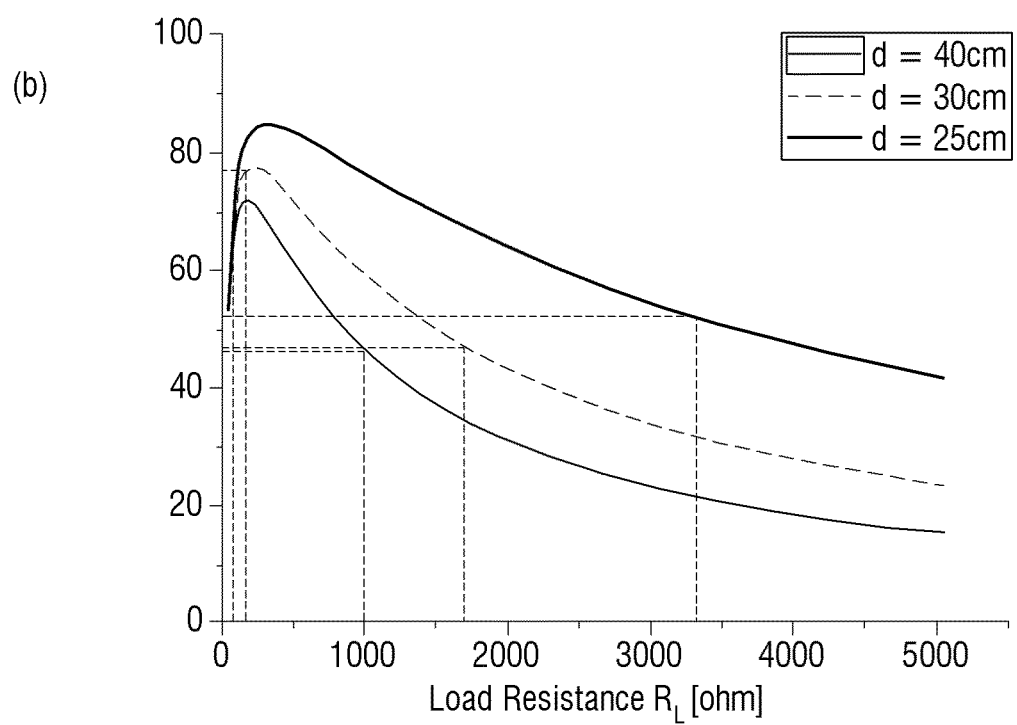
Figure 17:
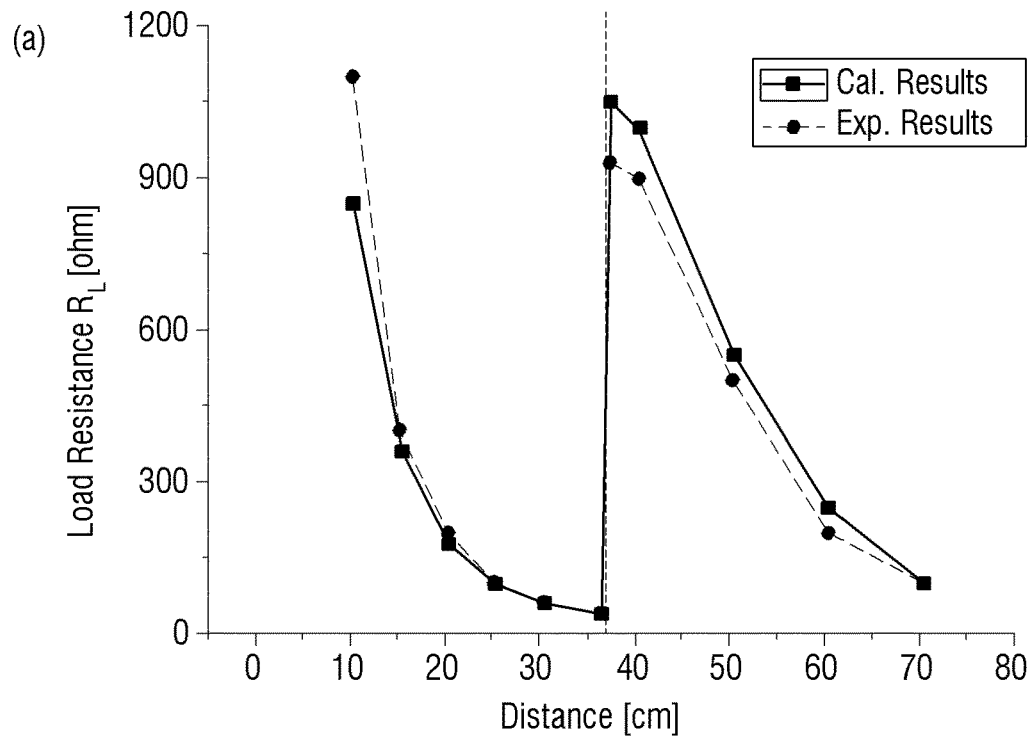
Figure 17:
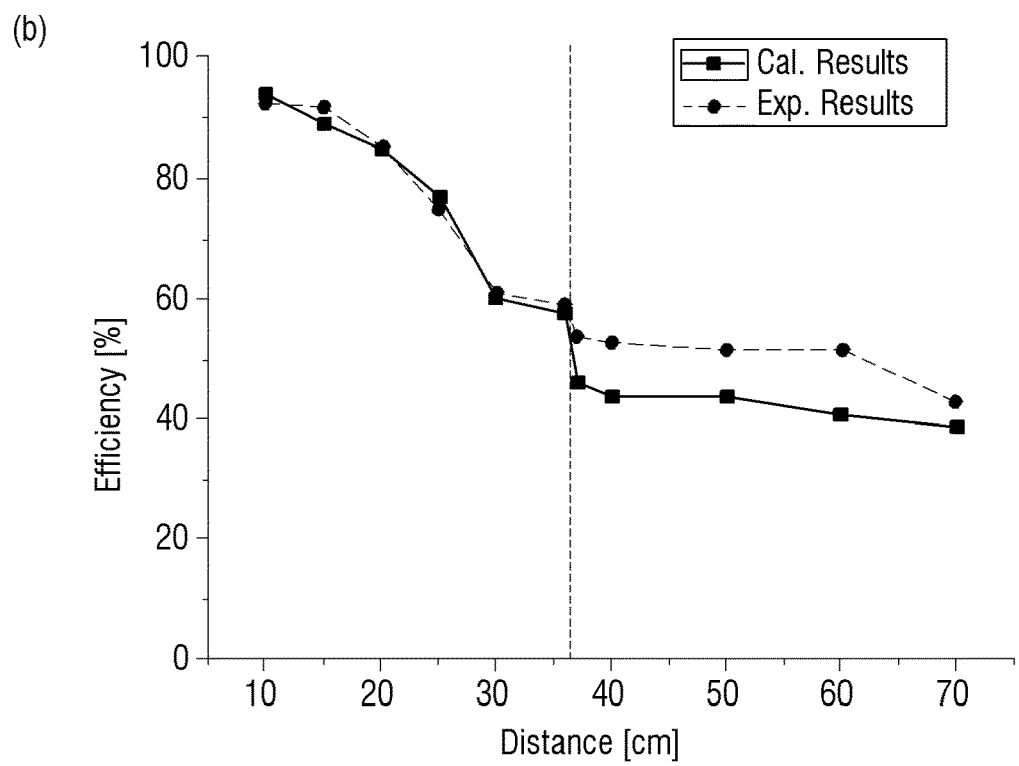

FIGS. 15 to 17 are views illustrating an efficiency graph by load resistance for target power satisfaction when the between the transmission unit and the receiving unit changes.

Referring to FIG. 15, there may be one target power satisfaction point in the weak region (frequency separation), and two target power satisfaction points in the strong region. In the weak region, the operation may be performed at one effective resistance (load resistance) operating point that satisfies target power in the weak region. A greater effective resistance between two points in the storing region may be significantly out of the operating range of the DC/DC converter, and thus efficiency thereof may be low.

However, when designing the DC/DC converter to allow the small effective resistance in the storing region to operate within the operating range, referring to FIGS. 15 to 17, not only high efficiency may be achieved in the strong region, but also constant power output control may be possible through effective resistance variance in accordance with the distance change in the wide range (in the weak region and in the strong region).

Figure 18:
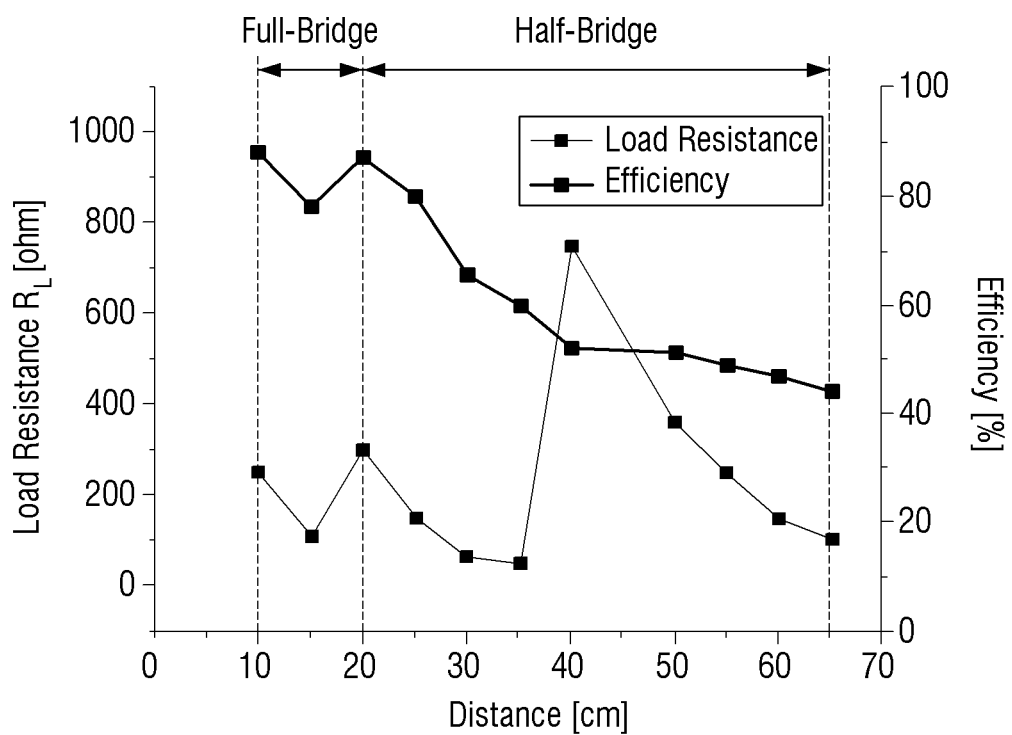
FIG. 18 is a view showing load resistance and efficiency for target power satisfaction when a distance between a transmission unit and a receiving unit changes.
Figure 19:
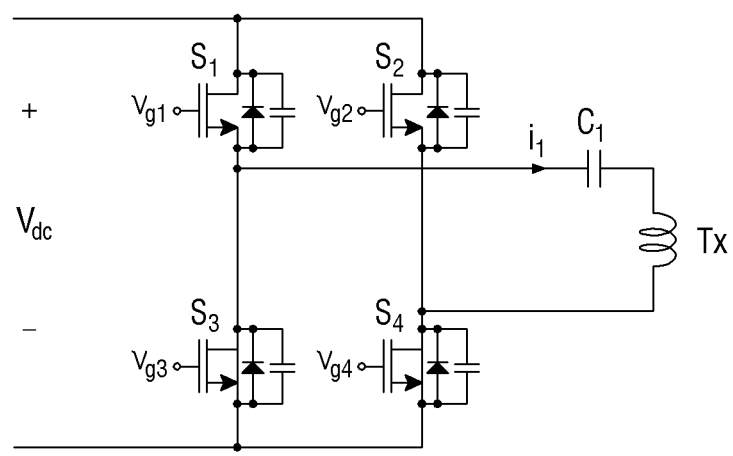
FIG. 19 is a view illustrating a convertible high-frequency inverter.
Figure 20:
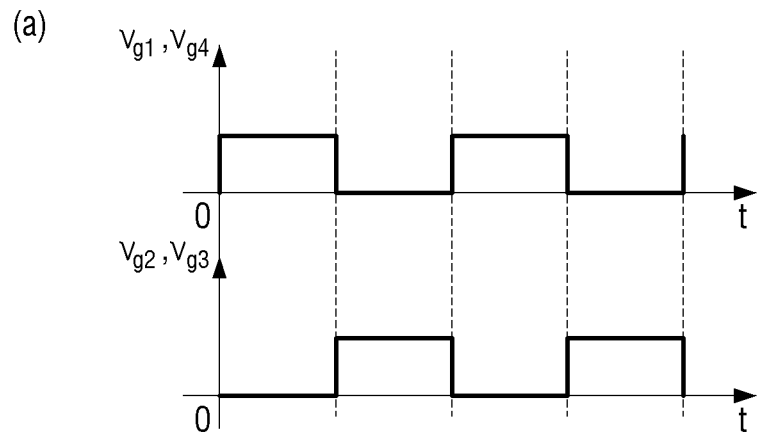
FIG. 20 is a view illustrating an example of operating an inverter in FIG. 19 using a full-bridge method or a half-bridge method.
Figure 20:
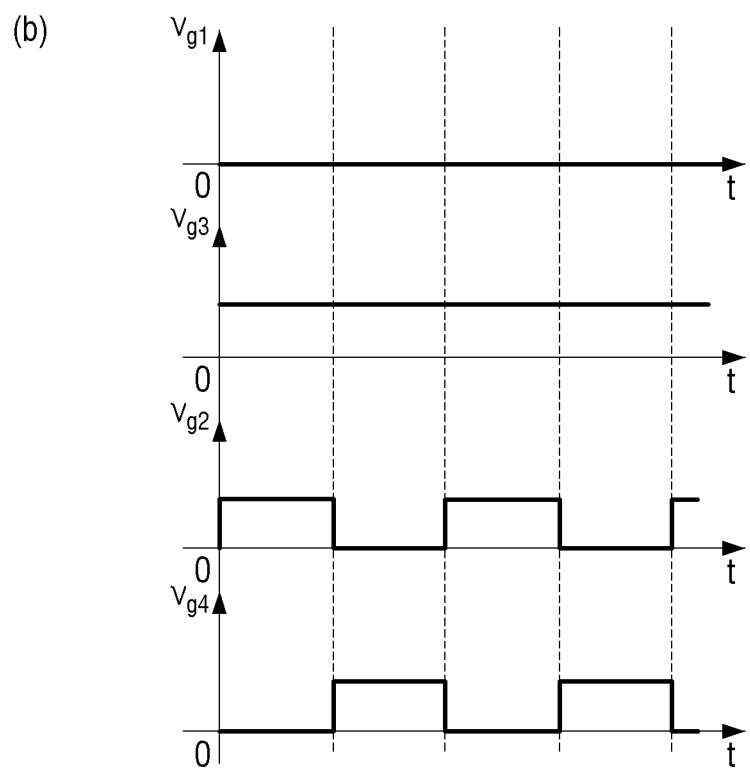

FIG. 18 is a view showing load resistance and efficiency for target power satisfaction when a distance between a transmission unit and a receiving unit changes, FIG. 19 is a view illustrating a convertible high-frequency inverter, and FIG. 20 is a view illustrating an example of operating an inverter in FIG. 19 using a full-bridge method or a half-bridge method.

In the storing region (frequency separation), as the distance becomes very short and the internal resistance $r_T$ significantly increases, the effective resistance that satisfies a target power point may not be present. For example, a target may be changed from $P_L$=100 W to $P_L$=150 W.

In this case, when the distance is in the storing region when the distance is determined through frequency scanning, referring to FIGS. 18 to 20, such problem can be solved by applying a convertible high-frequency inverter so that a half-bridge inverter is changed to a full-bridge inverter.

According to an embodiment of the present disclosure, without additional communication circuit between the wireless power transmission unit 203 and the wireless power receiving unit 216, the distance between the wireless power transmission unit 203 and the wireless power receiving unit 216 may be determined by using only the current information of the wireless power transmission unit 203, and by applying the optimal operating frequency according to the distance determination, constant power output control may be possible even in the change of the distance in the wide range without a complicated control circuit (e.g. a frequency variance control method).

In addition, by applying the effective resistance variance method and the convertible high-frequency inverter through optimal design of the DC/DC converter of the wireless power receiving unit 216, constant power output control may be possible even in the change in distance in the wide range (e.g. a method for controlling a DC/DC converter).

Figure 21:
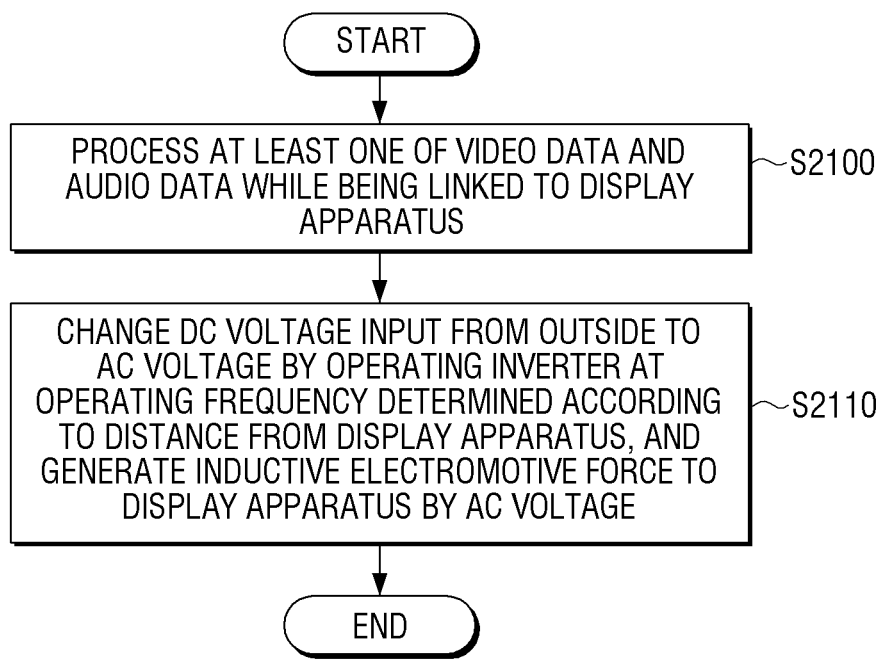
FIG. 21 is a flowchart showing a process for driving an electronic apparatus according to a first example embodiment of the present disclosure.

FIG. 21 is a flowchart showing a process for driving an electronic apparatus (e.g. a sound output apparatus, an image replay apparatus, etc.) according to a first example embodiment of the present disclosure.

For ease of explanation, referring to FIG. 21 together with FIGS. 1 and 2, an electronic apparatus 100 and 200 according to an embodiment of the present disclosure may be linked to a display apparatus 110 and 210 to perform at least one of video data or audio data at step S2100.

When the electronic apparatus 100 and 200 is the sound output apparatus 100 as shown in FIG. 1, audio data may be processed, and when the electronic apparatus 100 and 200 is a set-top box or an access point, video data and audio data may be processed.

The electronic apparatus 100 and 200 may operate the inverter with the operating frequency determined depending on the distance between the electronic apparatus 100 and 200 and the display apparatus 110 and 210, a DC voltage input to the outside (corresponding to the DC voltage converted from the AV voltage) may be converted into the AC voltage, and the inductive electromotive force may be generated in the display apparatus by the AC voltage at step S2110.

The detailed description has been fully made, and thus the further description will be omitted.

Figure 22:
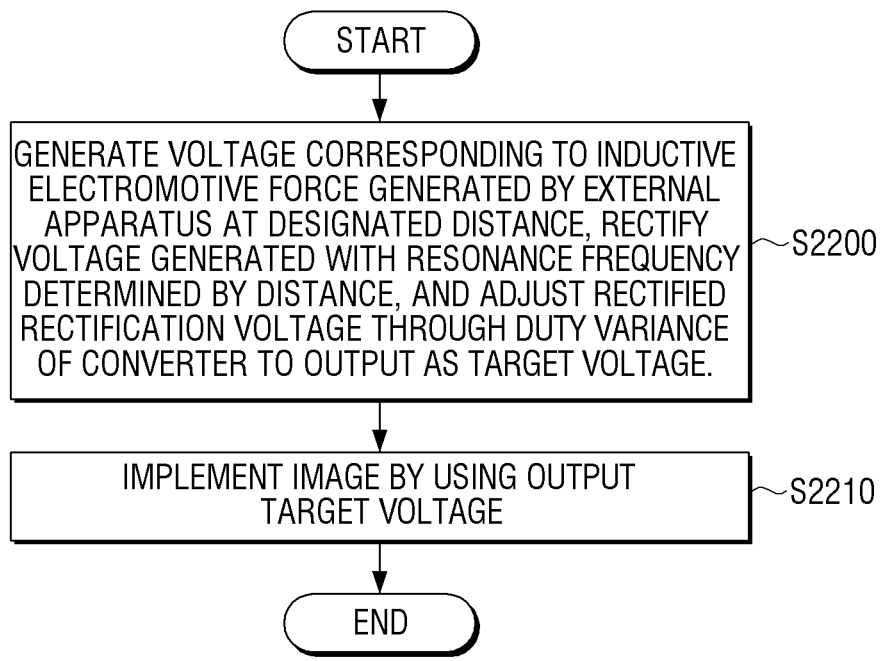
FIG. 22 is a flowchart showing a process for driving a display apparatus according to an embodiment of the present disclosure.

FIG. 22 is a flowchart showing a process for driving a display apparatus according to an embodiment of the present disclosure.

For ease of explanation, referring to FIG. 21 together with FIGS. 1 and 2, the display apparatus 110 and 210 may generate a voltage corresponding to the inductive electromotive force generated by the external apparatus located at a predetermined distance, for example, the electronic apparatus 100 and 200, rectify the generated voltage with a resonance frequency determined based on the distance, and adjust the rectified voltage through the duty variance of the converter to output the rectified voltage as a target voltage at step S2210.

The display apparatus 110 and 210 may display an image on a display panel by using a target voltage at step S2200.

The detailed description has been fully made, and thus the further description will be omitted.

FIG. 23 is a flowchart showing a process for driving an electronic apparatus according to a second example embodiment of the present disclosure, and a distance measuring process.

For ease of explanation, referring to FIG. 23 together with FIGS. 1 and 2, the electronic apparatus 100 and 200 may store the operating frequency and the current value (or information) in accordance with the distance from the display apparatus 110 and 210 at step S2300. The current value may include a maximum current value.

The electronic apparatus 100 and 200 may transmit the voltage generated in accordance with the change of the operating frequency during the initial driving after being installed in a random space to the display apparatus 110 and 210 in a wireless manner at step 2310. The expression "transmit in a wireless manner" means generating the inductive electromotive force in the display apparatus 110 and 210 by the voltage generated by the electronic apparatus 100 and 200.

In addition, the electronic apparatus 100 and 200 may sense a current value according to the changed operating frequency at step S2320. Accordingly, the maximum current value may be sensed at a specific frequency.

The electronic apparatus 100 and 200 may identify the operating frequency when the sensed current value coincides with the stored current value, for example, when the sensed maximum current value coincides with the stored current value at step S2330.

As such, when the operating frequency is identified, the electronic apparatus 100 and 200 may determine the distance accordingly. That is, the distance may be determined by confirming the operating frequency and current value, which are matched with the distance and stored for determination.

According to an embodiment of the present disclosure, by placing a wall-mounted display apparatus on a wall without being restricted by a distance within a given range, the wired line can be eliminated and visually good in the interior design aspect.

While the present disclosure has been described that all elements of an embodiment are coupled to one another or operate in combination, it is to be understood that the present disclosure is not limited to the disclosed embodiments. That is, within the scope of the present disclosure, all of the elements may be selectively coupled to one another in one or more of combinations. In addition, although all of the elements may be implemented as one independent hardware, some or all of the elements may be selectively combined to embody as a computer program including a program module performing a part or all of the functions in one or a plurality of hardware. The codes and code segments that constitute a computer program may be easily deduced by those skilled in the art. Such a computer program may be stored in a non-transitory computer readable medium readable by a computer, readable and executed by a computer, thereby realizing an embodiment of the present disclosure.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. A display apparatus, comprising a wireless power receiver, the wireless power receiver including:
   a coil configured to receive a high-frequency magnetic field generated by a wireless power transmission apparatus based on duty data of an inverter included in the wireless power transmission apparatus determined in accordance with a distance between the display apparatus and the wireless power transmission apparatus;
   a rectifier configured to rectify an output of the coil;
   a converter configured to:
      receive an output of the rectifier,
      generate a target voltage to output for use by the display apparatus based on the output received from the rectifier; and
   a processor configured to:
      compare an output of the converter and a predetermined value,
      based on the distance between the display apparatus and the wireless power transmission apparatus being within a first distance, adjust a frequency and a duty of the converter to change an effective resistance value of a load resistance connected to the converter; and
      based on the distance between the display apparatus and the wireless power transmission apparatus being within a second distance less than the first distance, transmit a request signal for changing an operating frequency of the inverter and a duty of the inverter, to the wireless power transmission apparatus.

2. The display apparatus as claimed in claim 1, wherein the inverter included in the wireless power transmission apparatus operates in a half-bridge method or in a small-gain topology method based on the distance between the display apparatus and the wireless power transmission apparatus being out of a predetermined distance, and operates in a full-bridge method or in a large-gain topology method based on the distance between the display apparatus and the wireless power transmission apparatus being within the predetermined distance.

3. The display apparatus as claimed in claim 2, wherein the converter comprises:
   a half-bridge converter configured to operate in the half-bridge method; and
   a full-bridge converter configured to operate in the full-bridge method.

4. An electronic apparatus, comprising:
   an interface configured to receive an input signal and process the input signal, the input signal comprising at least one of a video signal or an audio signal;
   an output configured to output the processed input signal to a display apparatus; and
   a wireless power transmitter comprising:
      an inverter configured to operate at an operating frequency determined in accordance with a distance between the electronic apparatus and the display apparatus and change a DC voltage input from an outside into an AC voltage; and a coil configured to generate a high-frequency magnetic field using the AC voltage for use in generating an inductive electromotive force in the display apparatus, wherein an operating frequency of the inverter and a duty of the inverter is changed according to a request signal received from the display apparatus based on the distance between the electronic apparatus and the display apparatus being within a predetermined distance.

5. The electronic apparatus as claimed in claim 4, further comprising:
a processor configured to determine the distance during initial driving of the electronic apparatus, and operate the inverter at an operating frequency corresponding to the determine distance.

6. The electronic apparatus as claimed in claim 5, wherein the processor is configured to determine the distance using a down-scanning method that reduces an operating frequency or an up-scanning method that increases an operating frequency.

7. The electronic apparatus as claimed in claim 6, wherein the processor is configured to determine a frequency corresponding to a peak of a resonance point based on a maximum current value sensed by using the up-scanning method, and determine a pre-stored operating frequency and a pre-stored duty corresponding to the determined frequency as an operating frequency of the inverter.

8. The electronic apparatus as claimed in claim 6, wherein the electronic apparatus performs down-scanning or up-scanning while a parallel capacitor is connected to a series resonance circuit of a power receiver included in the display apparatus to prevent a no-load condition of the power receiver.

9. The electronic apparatus as claimed in claim 6, wherein the electronic apparatus, during up-scanning, scans an input voltage of the inverter by applying a voltage lower than a voltage necessary for a maximum load operation reference of a power receiver included in the display apparatus, or by setting a duty of the inverter to a low level and lowering an effective input voltage of the inverter.

10. The electronic apparatus as claimed in claim 6, wherein the electronic apparatus performs an initial scanning operation in a state in which a switch between a receiver-converter included in the display apparatus and load is turned off, and performs normal wireless power transmission in a state in which the switch is turned on.

11. The electronic apparatus as claimed in claim 4, further comprising:
a ZVS element provided between an output end of the inverter and a resonance coil, and configured to perform a zero voltage switching (ZVS) operation of a plurality of switching elements included in the inverter based on the distance between the display apparatus and the wireless power transmission apparatus exceeding a threshold value.

12. A method for driving a display apparatus, comprising:
receiving, by a coil of a wireless power receiver of the display apparatus, a high-frequency magnetic field generated by a wireless power transmission apparatus based on duty data of an inverter included in the wireless power transmission apparatus determined in accordance with a distance between the display apparatus and the wireless power transmission apparatus;
rectifying, by a rectifier of the wireless power receiver, a voltage generated by the coil;
receiving, by a converter of the wireless power receiver, an output of the rectifier;
generating, by the converter, a target voltage to output for use by the display apparatus based on the output received from the rectifier;
comparing, by the converter, an output of the converter and a predetermined value; and
based on the distance between the display apparatus and the wireless power transmission apparatus being within a first distance, adjusting a frequency and a duty of the converter to change an effective resistance value of a load resistance connected to the converter and
based on the distance between the display apparatus and the wireless power transmission apparatus being within a second distance less than the first distance, transmitting, a request signal for changing an operating frequency of the inverter and a duty of the inverter, to the wireless power transmission apparatus.

13. The electronic apparatus as claimed in claim 4, wherein the output is configured for wireless signal transmission.

14. The electronic apparatus as claimed in claim 4, wherein the output is configured for wired signal transmission.

* * * * *